United States Patent
Xu et al.

(10) Patent No.: US 12,200,556 B2
(45) Date of Patent: Jan. 14, 2025

(54) MODIFIED HANDOVER PROCEDURES FOR EARTH FIXED AND EARTH MOBILE BEAMS

(71) Applicant: Apple Inc., Cupertino, CA (US)

(72) Inventors: Fangli Xu, Beijing (CN); Sarma V. Vangala, Campbell, CA (US); Chunxuan Ye, San Diego, CA (US); Haijing Hu, Los Gatos, CA (US); Krisztian Kiss, Hayward, CA (US); Murtaza A. Shikari, Mountain View, CA (US); Naveen Kumar R. Palle Venkata, San Diego, CA (US); Ralf Rossbach, Munich (DE); Sree Ram V. Kodali, San Jose, CA (US); Srinivasan Nimmala, San Jose, CA (US); Vijay Venkataraman, San Jose, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/440,897

(22) PCT Filed: Oct. 23, 2020

(86) PCT No.: PCT/CN2020/123349
§ 371 (c)(1),
(2) Date: Sep. 20, 2021

(87) PCT Pub. No.: WO2022/082756
PCT Pub. Date: Apr. 28, 2022

(65) Prior Publication Data
US 2023/0247506 A1    Aug. 3, 2023

(51) Int. Cl.
*H04W 36/08* (2009.01)
*H04W 36/00* (2009.01)

(52) U.S. Cl.
CPC ..... *H04W 36/083* (2023.05); *H04W 36/0009* (2018.08); *H04W 36/0064* (2023.05)

(58) Field of Classification Search
CPC .......... H04W 36/083; H04W 36/0009; H04W 36/0064; H04W 84/06; H04B 7/0621;
(Continued)

(56) References Cited

U.S. PATENT DOCUMENTS

| 2010/0240385 A1* | 9/2010 | Lohr ................. H04W 36/0072 455/452.2 |
| 2017/0041830 A1* | 2/2017 | Davis .................. H04B 7/1851 |

(Continued)

FOREIGN PATENT DOCUMENTS

CN         110545138 A     12/2019

OTHER PUBLICATIONS

3rd Generation Partnership Project; Technical Specification Group Radio Access Network; Solutions for NR to support non-terrestrial networks (NTN) (Release 16); 3GPP TR 38.821 V16.0.0 (Dec. 2019); http://www.3gpp.org.
(Continued)

*Primary Examiner* — Ricky Q Ngo
*Assistant Examiner* — Kabir U Jahangir
(74) *Attorney, Agent, or Firm* — Eschweiler & Potashnik, LLC

(57) ABSTRACT

A user equipment (UE), next generation NodeB (gNB), or other network component can operate to configure a group configuration message that initiates a plurality of UEs in a coverage area of a non-terrestrial network (NTN) to concurrently transfer communication from a first beam of a first satellite to a second beam of a second satellite. The communications of one or more UEs can be re-directed to the second beam of the second satellite based on downlink control information of the group configuration message.

17 Claims, 18 Drawing Sheets

(58) Field of Classification Search
CPC ... H04B 7/06; H04B 7/18541; H04B 7/18504
See application file for complete search history.

(56) References Cited

U.S. PATENT DOCUMENTS

| | | | |
|---|---|---|---|
| 2020/0178135 A1* | 6/2020 | Yun | H04W 36/0061 |
| 2020/0314914 A1* | 10/2020 | Roy | H04W 74/006 |
| 2022/0046486 A1* | 2/2022 | Shrestha | H04W 36/0009 |
| 2022/0312283 A1* | 9/2022 | Chen | H04W 74/008 |
| 2023/0239763 A1* | 7/2023 | Wei | H04W 36/32 370/331 |
| 2023/0269630 A1* | 8/2023 | Teyeb | H04W 36/0009 370/331 |

OTHER PUBLICATIONS

International Preliminary Report on Patentability dated Apr. 13, 2023 for International Application PCT/CN2020/123349.
International Search Report Dated Jul. 28, 2021 for International Application PCT/CN2020/123349.
International Written Opinion Dated Jul. 28, 2021 for International Application PCT/CN2020/123349.
MediaTek Inc.; "Grouping and Automatic Reconfiguration for Handover Enhancement"; R201912923; Oct. 18, 2019.
European Extended Search Report mailed May 10, 2024 in connection with Application No. 20958338.
InterDigital Inc.; "Mobility Enhancements for Non-Terrestrial Networks"; 3GPP RAN WG2 Meeting #106; R2-1908245; May 13, 2019.
Ericsson; "CHO for NTN LEO"; 3GPP TSG-RAN WG2 #108; Tdoc R2-1916390; Nov. 18, 2019.

* cited by examiner

MODIFIED HANDOVER PROCEDURES FOR EARTH FIXED AND EARTH MOBILE BEAMS

REFERENCE TO RELATED APPLICATIONS

This application is a National Phase entry application of International Patent Application No. PCT/CN2020/123349 filed Oct. 23, 2020, entitled "MODIFIED HANDOVER PROCEDURES FOR EARTH FIXED AND EARTH MOBILE BEAMS", the contents of which are herein incorporated by reference in their entirety.

FIELD

The present disclosure related to wireless technology, and more specifically, pertains to techniques for modified handover procedures for earth fixed and earth mobile beams.

BACKGROUND

As the number of mobile devices within wireless networks, and the demand for mobile data traffic, continue to increase, changes are made to system requirements and architectures to better address current and anticipated demands. For example, some wireless communication networks (e.g., fifth generation (5G) or new radio (NR) networks) may be developed to include non-terrestrial networks (NTN) comprising one or more satellites. In such scenarios, the satellites may operate as transparent network nodes linking user equipment (UEs) with a ground-based portions of the network, such as base stations and core network (CN).

DETAILED DESCRIPTION

Figure 1:
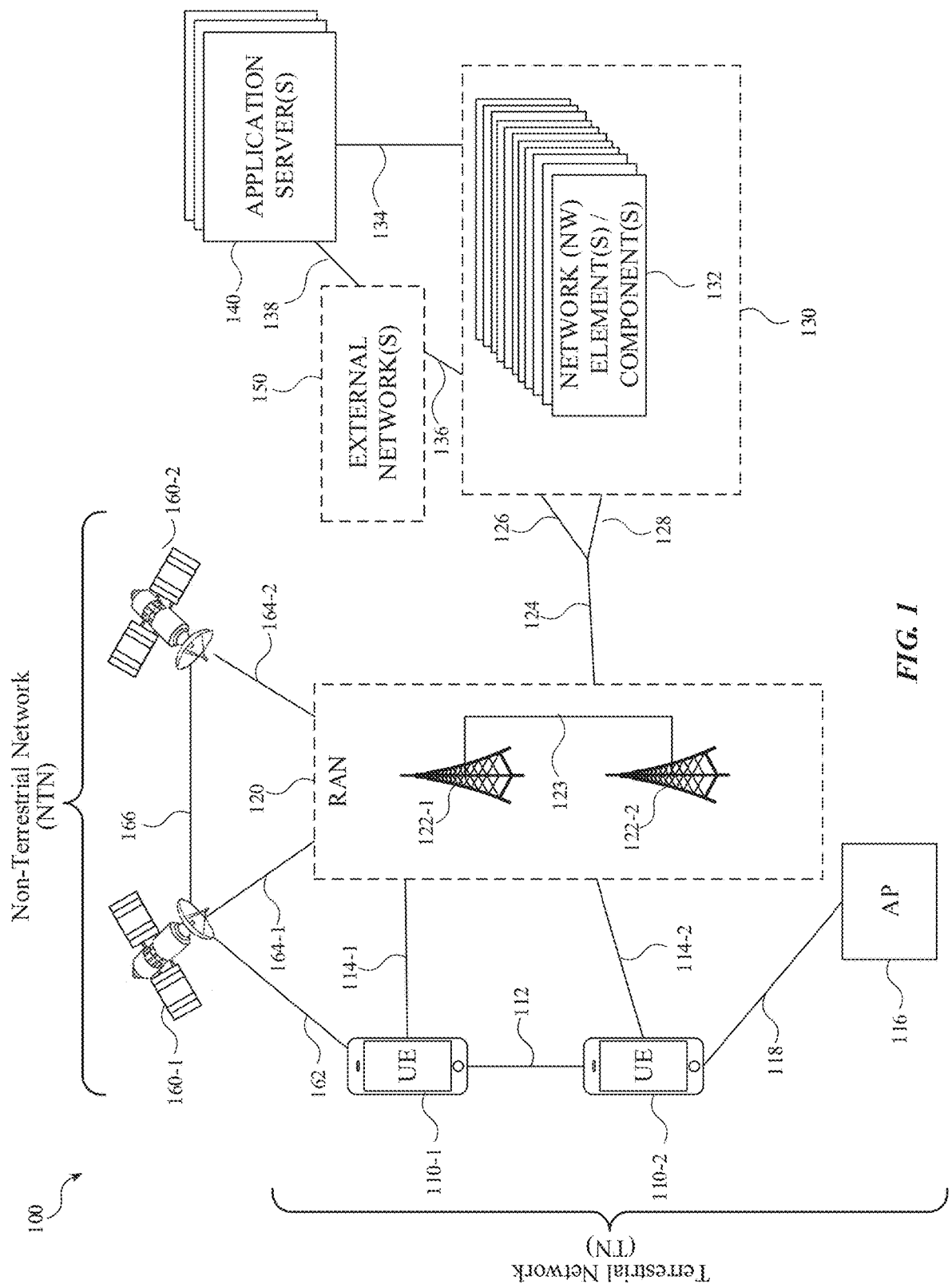
FIG. 1 is a block diagram illustrating an architecture of a system including a Core Network (CN), for example a Fifth Generation (5G) CN (5GC), in accordance with various aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like (or similarly ending) reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of the above, various aspects/embodiments are disclosed for communications in NR network devices (e.g., user equipment (UE), evolved NodeB (eNB), a next generation NodeB (gNB), a new radio (NR) base station (BS), or the like). A beam redirection can be generated from a first satellite to a second satellite for UEs in a non-terrestrial network (NTN). A group configuration message of a downlink control information initiates the UEs to concurrently transfer communication to an alternate beam of the second satellite from a beam of the first satellite based on the beam redirection, and then provided to the UEs to trigger a concurrent re-direction and handover operation to the incoming satellite. The source gNB providing the message can be configured in a transparent mode with the satellite in which at least a part of the gNB is integrated with or comprises the satellite in the NTN network via a distributed unit connected to a processor component of the satellite. Because the gNB can be aware of incoming and transition coverage areas to a greater extent, the gNB initiates the redirection and handover (HO) without the UE assistance, UE measurement report, or UE HO request, but based on ephemeris data the gNB configures the group message with downlink control information (DCI) and provides it at the same time to all the UEs within the coverage area for a satellite beam of an incoming satellite.

The group configuration message can include a configuration of a target gNB of the incoming satellite to the plurality of UEs, in which the target gNB can be in transparent mode or grounded. The configuration of the target can include the cell ID of the target, for example, to enable all the UEs in the coverage area, whether in radio resource control (RRC) idle mode, RRC connected mode, or otherwise to begin redirecting their communication paths to the target gNB. wherein the group configuration message comprises a broadcast or a multi-cast radio resource control (RRC) reconfiguration message based on a group radio network temporary identifier (G-RNTI). In some examples, the group configuration message can comprise a broadcast or a multi-cast message. The group configuration message can be common configuration message, or may or may not be configured as a radio resource control (RRC) reconfiguration message based on a group radio network temporary identifier (G-RNTI), depending on the particular architecture of operation for the UEs.

Additional aspects and details of the disclosure are further described below with reference to figures.

Aspects described herein can be implemented into a system using any suitably configured hardware and/or software. Referring to FIG. 1, illustrated is an example network 100, according to various aspects discussed herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3nd generation (3G), 4nd generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like.

As shown, UE 110 may also, or alternatively, connect to access point (AP) 116 via interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable the connections 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 120 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally or alternatively, one or more of RAN nodes 120 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle radio resource control (RRC) and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system 100 is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to an secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers (as) 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application server 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2). Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Core NW elements/components can include one or more of the following functions and network components: an Authentication Server Function (AUSF); an Access and Mobility Management Function (AMF); a Session Management Function (SMF); a Network Exposure Function (NEF); a Policy Control Function (PCF); a Network Repository Function (NRF); a Unified Data Management (UDM); an Application Function (AF); a User Plane (UP) Function (UPF); and a Network Slice Selection Function (NSSF).

The UPF can act as an anchor point for intra-RAT and inter-RAT mobility, an external Protocol Data Unit (PDU) session point of interconnect to Data Network (DN), and a branching point to support multi-homed PDU session. The UPF can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF can include an uplink classifier to support routing traffic flows to a data network. A DN can be various network operator services, Internet access, or third-party services, include, or be similar to, an application server. The UPF can interact with the SMF via an N4 reference point between the SMF and the UPF.

The AUSF can store data for authentication of UE 101 and handle authentication-related functionality. The AUSF can facilitate a common authentication framework for various access types. The AUSF can communicate with the AMF via an N12 reference point between the AMF and the AUSF; and can communicate with the UDM via an N13 reference point between the UDM and the AUSF. Additionally, the AUSF can exhibit an Nausf service-based interface.

The AMF can be responsible for registration management (e.g., for registering UE 110, etc.), connection management, reachability management, mobility management, and lawful interception of AMF-related events, and access authentication and authorization. The AMF can be a termination point for the N11 reference point between the AMF and the SMF. The AMF can provide transport for SM messages between the UE 110 and the SMF, and act as a transparent proxy for routing SM messages. AMF can also provide transport for SMS messages between UE 110 and a Short Message Service (SMS) Function (SMSF) (not shown in FIG. 1). AMF can act as Security Anchor Function (SEAF), which can include interaction with the AUSF and the UE 110 and/or receipt of an intermediate key that was established as a result of the UE 110 authentication process. Where Universal Subscriber Identity Module (USIM) based authentication is used, the AMF can retrieve the security material from the AUSF. AMF can also include a Single-Connection Mode (SCM) function, which receives a key from the SEA that it uses to derive access-network specific keys. Furthermore, AMF can be a termination point of a RAN Control Plane (CP) interface, which can include or be an N2 reference point between the (R)AN 120 and the AMF; and the AMF can be a termination point of Non Access Stratum (NAS) (N1) signaling, and perform NAS ciphering and integrity protection.

AMF can also support NAS signaling with a UE 110 over a non-3GPP (N3) Inter Working Function (IWF) interface. The N3IWF can be used to provide access to untrusted entities. N3IWF can be a termination point for the N2 interface between the (R)AN 120 and the AMF for the control plane, and can be a termination point for the N3 reference point between the (R)AN 120 and the UPF for the user plane. As such, the AMF can handle N2 signaling from the SMF and the AMF for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 110 and AMF via an N1 reference point between the UE 110 and the AMF, and relay uplink and downlink user-plane packets between the UE 110 and UPF. The N3IWF also provides mechanisms for IPsec tunnel establishment with the UE 110. The AMF can exhibit an Namf service-based interface, and can be a termination point for an N14 reference point between two AMFs 121 and an N17 reference point between the AMF and a 5G Equipment Identity Register (5G-EIR) (not shown in FIG. 1).

The UE 110 can be registered with the AMF in order to receive network services. Registration Management (RM) is used to register or deregister the UE 110 with the network (e.g., AMF), and establish a UE context in the network (e.g., AMF). The UE 110 can operate in an RM-REGISTERED state or an RM-DEREGISTERED state. In the RM-DEREGISTERED state, the UE 110 is not registered with the network, and the UE context in AMF holds no valid location or routing information for the UE 110 so the UE 110 is not reachable by the AMF. In the RM-REGISTERED state, the UE 110 is registered with the network, and the UE context in AMF can hold a valid location or routing information for the UE 110 so the UE 110 is reachable by the AMF. In the RM-REGISTERED state, the UE 110 can perform mobility Registration Update procedures, perform periodic Registration Update procedures triggered by expiration of the periodic update timer (e.g., to notify the network that the UE 110 is still active), and perform a Registration Update procedure to update UE capability information or to re-negotiate protocol parameters with the network, among others.

The AMF can store one or more RM contexts for the UE 110, where each RM context is associated with a specific access to the network. The RM context can be a data structure, database object, etc. that indicates or stores, inter alia, a registration state per access type and the periodic update timer. The AMF can also store a 5GC Mobility Management (MM) context that can be the same or similar to an (Enhanced Packet System (EPS))MM ((E)MM) context. In various embodiments, the AMF can store a Coverage Enhancement (CE) mode B Restriction parameter of the UE 110 in an associated MM context or RM context. The AMF can also derive the value, when needed, from the UE's usage setting parameter already stored in the UE context (and/or MM/RM context).

Connection Management (CM) can be used to establish and release a signaling connection between the UE 110 and the AMF over the N1 interface. The signaling connection is used to enable NAS signaling exchange between the UE 110 and the CN 130, and comprises both the signaling connection between the UE and the AN (e.g., RRC connection or UE-N3IWF connection for non-3GPP access) and the N2 connection for the UE 110 between the AN (e.g., RAN 110) and the AMF. The UE 110 can operate in one of two CM states, CM-IDLE mode or CM-CONNECTED mode. When the UE 110 is operating in the CM-IDLE state/mode, the UE 110 may have no NAS signaling connection established with the AMF over the N1 interface, and there can be (R)AN 120 signaling connection (e.g., N2 and/or N3 connections) for the UE 110. When the UE 110 is operating in the CM-CONNECTED state/mode, the UE 110 can have an established NAS signaling connection with the AMF over the N1 interface, and there can be a (R)AN 120 signaling connection (e.g., N2 and/or N3 connections) for the UE 110. Establishment of an N2 connection between the (R)AN 120 and the AMF can cause the UE 110 to transition from CM-IDLE mode to CM-CONNECTED mode, and the UE 110 can transition from the CM-CONNECTED mode to the CM-IDLE mode when N2 signaling between the (R)AN 120 and the AMF is released.

The SMF can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 110 and a data network DN identified by a Data Network Name (DNN). PDU sessions can be established upon UE 110 request, modified upon UE 110 and 5GC 120 request, and released upon UE 110 and 5GC 120 request using NAS SM signaling exchanged over the N1 reference point between the UE 110 and the SMF. Upon request from an application server, the 5GC 120 can trigger a specific application in the UE 110. In response to receipt of the trigger message, the UE 110 can pass the trigger message (or relevant parts/information of the trigger message) to one or more identified applications in the UE 110. The identified application(s) in the UE 110 can establish a PDU session to a specific DNN. The SMF can check whether the UE 110 requests are compliant with user subscription information associated with the UE 110. In this regard, the SMF can retrieve and/or request to receive update notifications on SMF level subscription data from the UDM 127.

The SMF can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs can be included in the system 100, which can be between another SMF in a visited network and the SMF in the home network in roaming scenarios. Additionally, the SMF can exhibit the Nsmf service-based interface.

Figure 2:
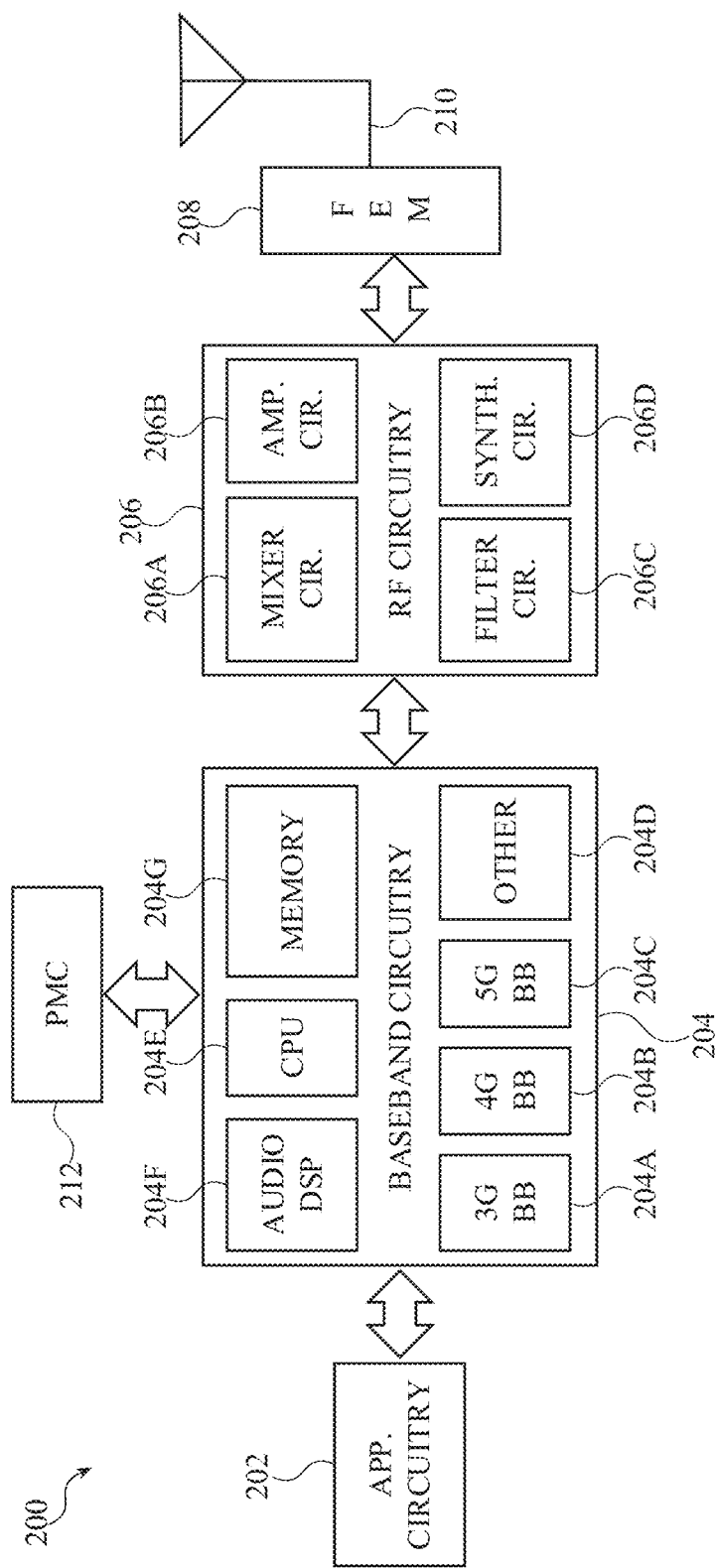
FIG. 2 is a diagram illustrating example components of a device that can be employed in accordance with aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node may not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the applications processor 202 depending on the desired output frequency. In some aspects, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM 208, or in both the RF circuitry 206 and the FEM 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
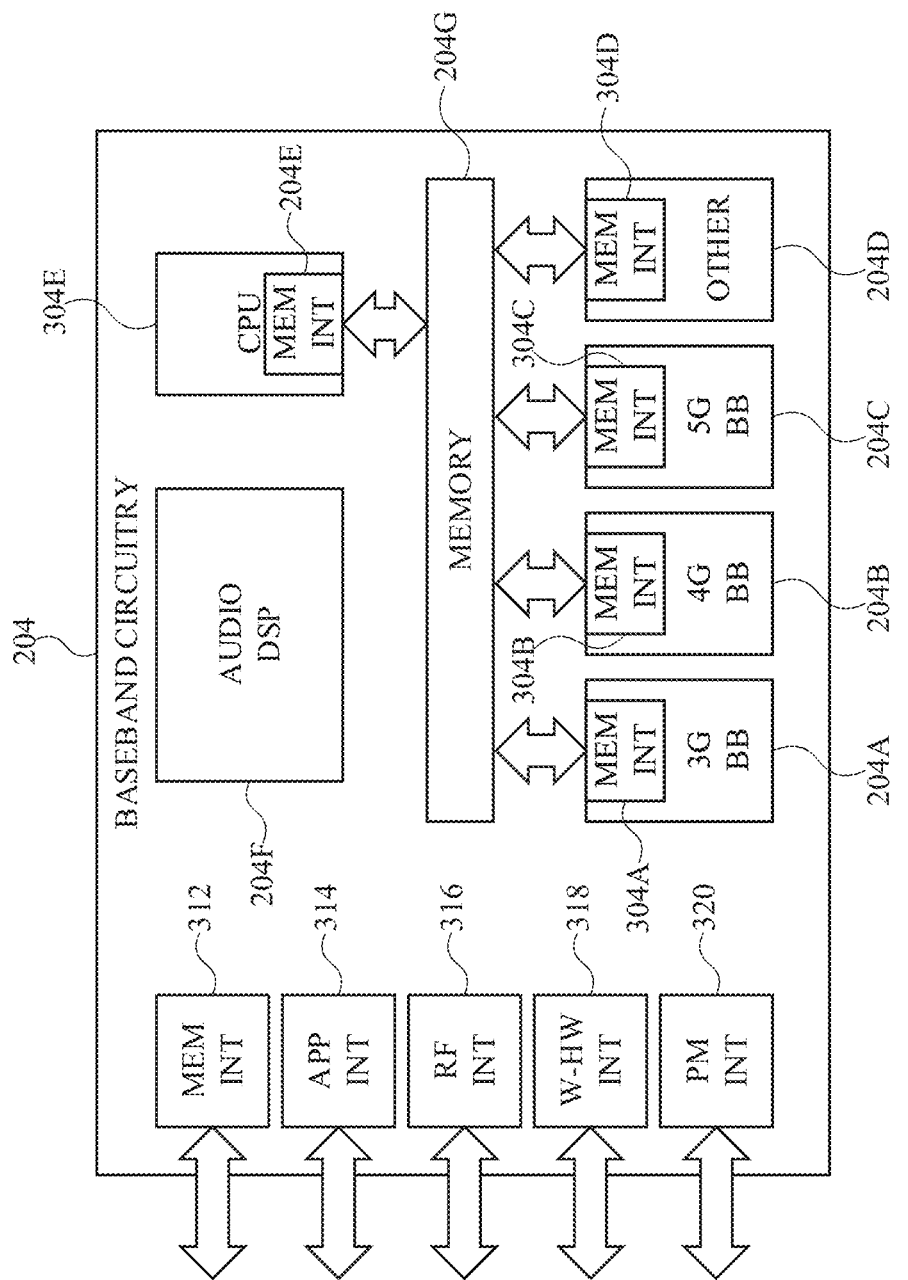
FIG. 3 is a diagram illustrating example interfaces of baseband circuitry that can be employed in accordance with aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
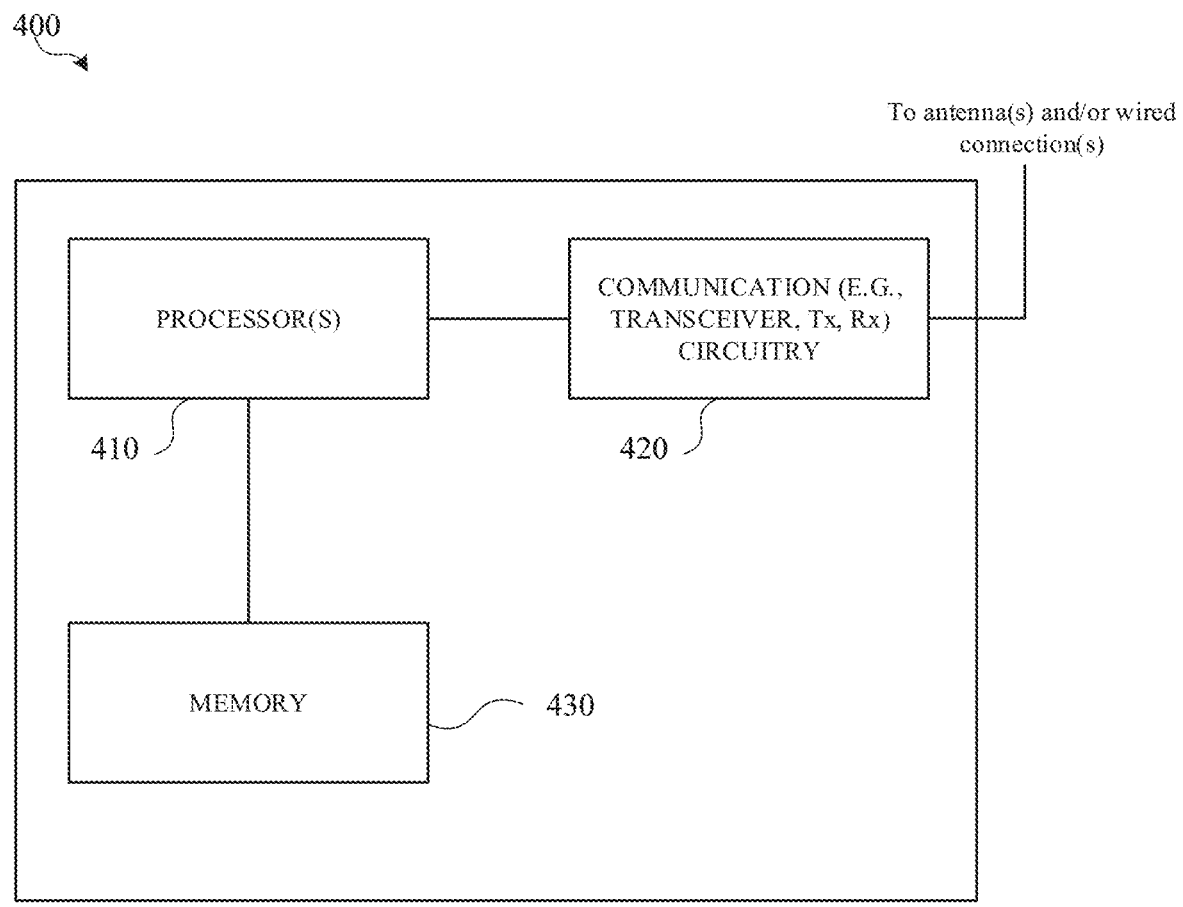
FIG. 4 is a block diagram illustrating a system that facilitates cell selection and/or reselection for a UE able to connect to one or more Non-Terrestrial Networks (NTNs), according to aspects discussed herein.

Referring to FIG. 4, illustrated is a block diagram of a system 400 employable at a UE (User Equipment), a Base Station (BS, such as a next generation Node B (gNodeB or gNB), evolved Node B (eNB), or other BS (base station)/TRP (Transmit/Receive Point)), an Access and Mobility Management Function (AMF) or another component of a 3GPP (Third Generation Partnership Project) network (e.g., a 5GC (Fifth Generation Core Network)) component or function such as a AMF (Access and Mobility Management Function)) that facilitates cell selection and/or reselection for a UE able to connect to one or more Non-Terrestrial Networks (NTNs), according to various aspects discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of aspects of system 400 (e.g., UE aspects, etc.) can be indicated via subscripts (e.g., system 400$_{UE}$ comprising processor(s) 410$_{UE}$, communication circuitry 420$_{UE}$, and memory 430$_{UE}$). In some aspects, such as BS aspects (e.g., system 400$_{BS}$) and network component (e.g., AMF, etc.) aspects (e.g., system 400$_{AMF}$) processor(s) 410$_{BS}$ (etc.), communication circuitry (e.g., 420$_{BS}$, etc.), and memory (e.g., 430$_{BS}$, etc.) can be in a single device or can be included in different devices, such as part of a distributed architecture. In aspects, signaling or messaging between different aspects of system 400 (e.g., 400$_1$ and 400$_2$) can be generated by processor(s) 410$_1$, transmitted by communication circuitry 420$_1$ over a suitable interface or reference point (e.g., a 3GPP air interface, N1, N8, N11, N22, etc.), received by communication circuitry 420$_2$, and processed by processor(s) 410$_2$. Depending on the type of interface, additional components (e.g., antenna(s), network port(s), etc. associated with system(s) 400$_1$ and 400$_2$) can be involved in this communication.

In various aspects, one or more of information (e.g., system information, resources associated with signaling, etc.), features, parameters, etc. can be configured to a UE via signaling (e.g., Access Stratum (AS) signaling, Non-Access Stratum (NAS)) originating from or routed through a Base Station (e.g., gNB, etc.) or other access point (e.g., via signaling generated by processor(s) $410_{BS}$, transmitted by communication circuitry $420_{BS}$, received by communication circuitry $420_{UE}$, and processed by processor(s) $410_{UE}$). Depending on the type of information, features, parameters, etc., the type of signaling employed and/or the exact details of the operations performed at the UE and/or BS in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Figure 5:
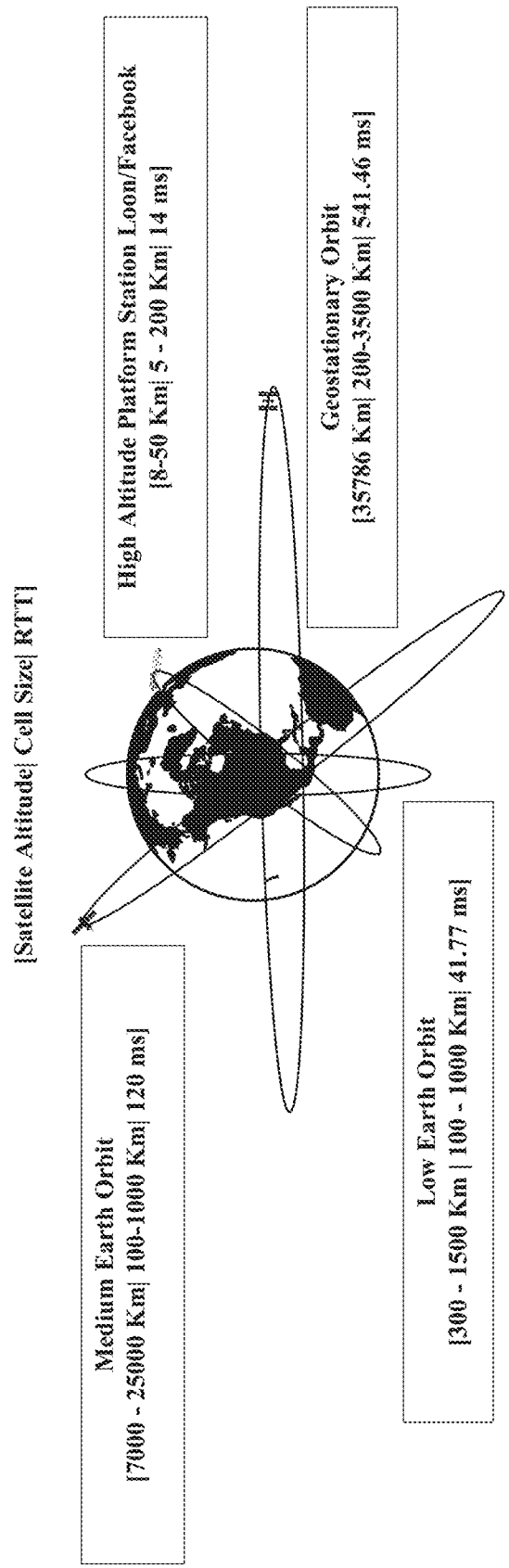
FIG. 5 illustrates a diagram showing different types of satellites that can be employed as nodes of Non-Terrestrial Network(s) (NTN(s)) along with relevant characteristics, in connection with aspects discussed herein.

Referring to FIG. 5, illustrated is a diagram showing different types of satellites that can be employed as nodes of NTN networks along with relevant characteristics, in connection with various aspects discussed herein. The different types of satellites include (i) medium Earth orbit (MEO) satellites, with an altitude between 7000-25000 km, cell size between 100-1000 km, and round-trip time of approximately 120 ms; (ii) low Earth orbit (LEO) satellites, with an altitude between 300-1500 km, cell size between 100-1000 km, and round-trip time of approximately 41.77 ms; (ii) low Earth orbit (LEO) satellites, with an altitude between 300-1500 km, cell size between 100-1000 km, and round-trip time of approximately 41.77 ms; (iii) high altitude platform station (HAPS) satellites, with an altitude between 8-50 km, cell size between 5-200 km, and round-trip time of approximately 14 ms; and (iv) geostationary orbit (GEO) satellites, with an altitude of 35768 km, cell size between 200-3500 km, and round-trip time of approximately 541.46 ms.

Figure 6:
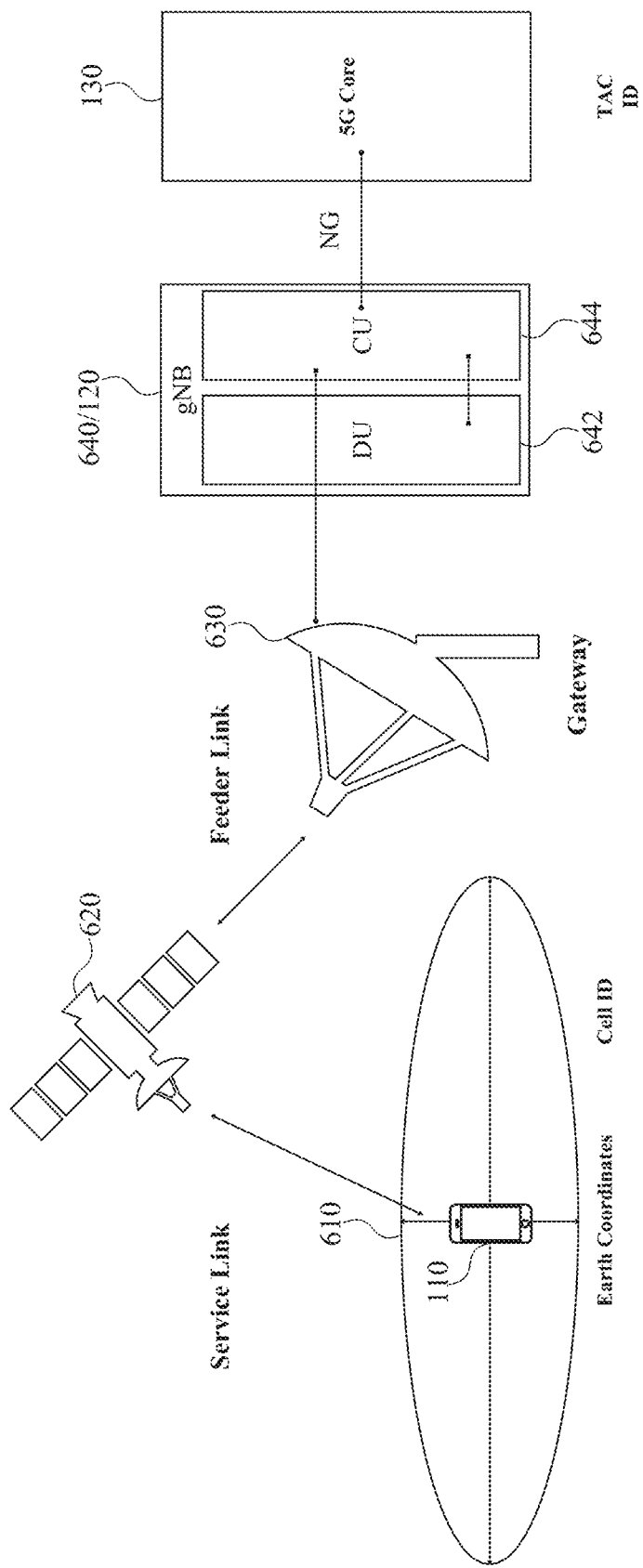
FIG. 6 illustrates a diagram of an example transparent mode architecture for a NTN network, in connection with various aspects discussed herein.

Various embodiments can employ a satellite that operates in a transparent mode, forwarding signaling between a UE and a gNB, while in other embodiments, part or all of a gNB can be located at the satellite. Referring to FIG. 6, illustrated is a diagram showing an example transparent mode architecture for a NTN network, in connection with various aspects discussed herein. In FIG. 6, a UE 110 can, based on its Earth coordinates, be located in a cell 610 served by a NTN, whereby UE 110 is connected to gNB 640 (or as one or more gNBs 120) comprising one or more Distributed Units/Components (DU(s)) 642 and a Central Unit/Components (CU) 644 and 5GC 130 via satellite 620 and gateway 630. The link between the UE 110 and satellite 620 is referred to as the service link, and the link between satellite 620 and the gateway 630 is referred to as the feeder link. The satellite 620 can also have similar components as illustrated and described as device 400 of FIG. 4, comprising processor(s) 410, communication circuitry 420, and memory 430, for example.

The CU 644 can be configured for the control plane for most of the activities on the UE side and the DU 642 can be configured for the user plane that can configure, which can configure actual data transfer themselves. DUs 642 can be created also using core based communication. The DU 642 and the CU 644 can be separated out from one another geographically so that, for example, one CU 644 can be controlling multiple DUs 642. This enables one or more DUs 642 can be placed closer to the UE 110 with connectivity to the CU 644 as an S1 interface, for example, as a gNB on-board based station, in which at least a part of the gNB 120 as a system or device is located on the satellite 620. Instead of placing an entire gNB 120 on a satellite 620, in an aspect, an architecture can have a component of the gNB 120 (e.g., the DU 642) located on satellite 620. The components of the gNB therefore can be directly connected to the processing circuitry of the satellite 620, while being communicatively coupled to the CU 644 at a ground level gNB part. In these, instances the satellite 620 can be configured for inter-satellite communicate with other satellites. Any one or more of the satellites/gNB 5GC architectures herein can be configured to various aspects/embodiments, in which the satellite 620 can communicate through gateway 630, which is connected to the internet. Such architectures can enable 3GPP to further utilize communications via the internet back in a coordinated connection between both satellite 620 and core network 130.

Figure 7:
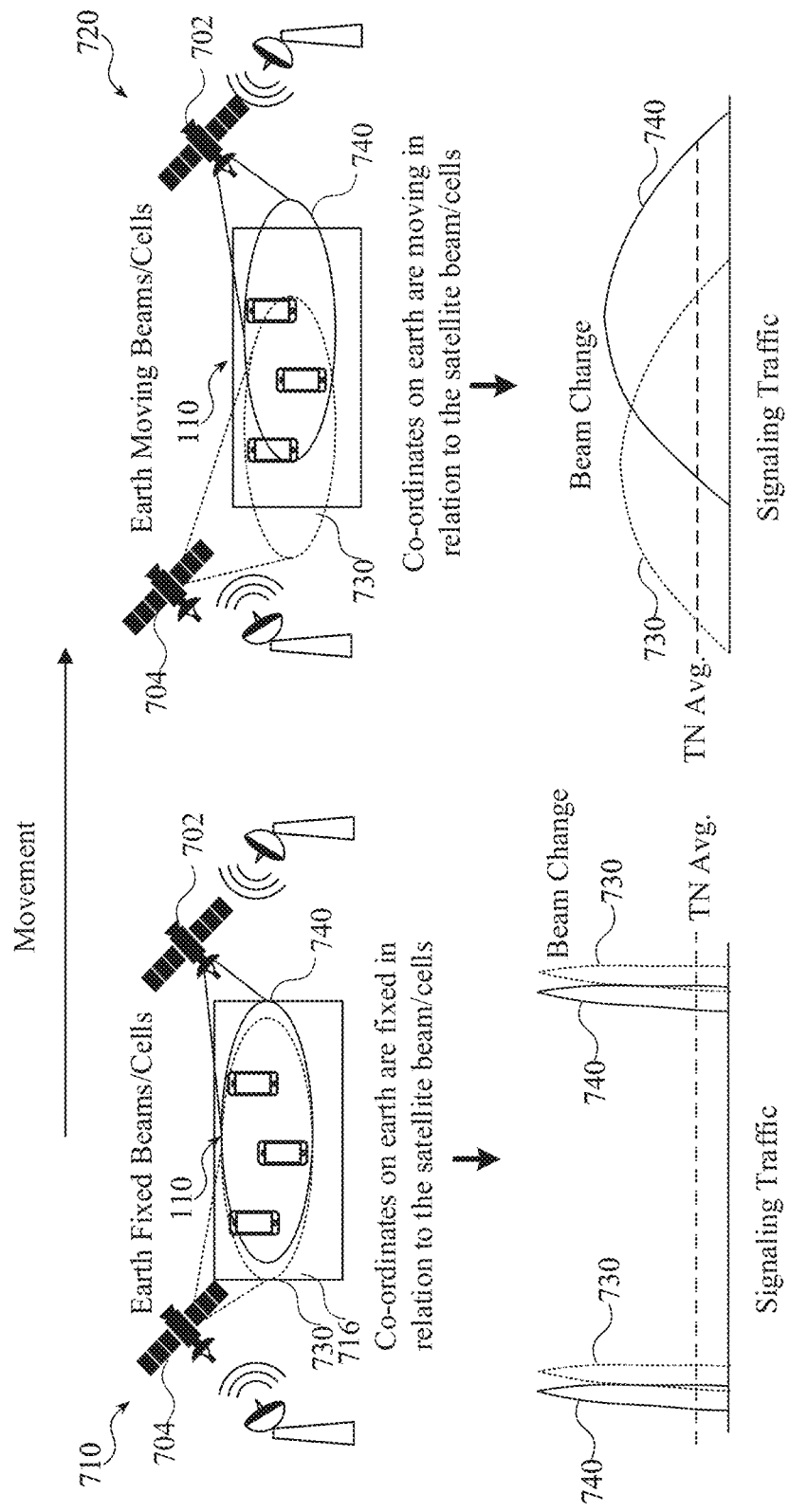
FIG. 7 illustrates diagrams of example NTN architectures of beam coverage and network architecture for a pair of satellites, in connection with aspects discussed herein.

Referring to FIG. 7, illustrated is diagrams of several example NTN systems of beam coverage and transparent mode network architecture for satellites, in connection with various aspects discussed herein. In FIGS. 7, 710 and 720 illustrate the Earth fixed and Earth moving beams/cells system scenarios, respectively.

The Earth fixed system 710 can include a first satellite as a source satellite 702 and a second satellite 704 as a target satellite. The group of UEs 110 (e.g., tens, hundreds, thousands, or other number of multiple UEs) are within a fixed co-ordinate area 716 (represented by a rectangle) on earth (e.g., Toronto, a set of city coordinates, or the like). If the network 130 communicates to a UE 110 via the gNB 120 in this coordinate area 716, the network knows the UE 110 is in this particular gNB 120 area based on a Traffic Area (TA) code. As such, with one or more protocols (e.g., a traffic area update) utilizing a TA, the gNB 120, for example, can trigger the UE 110 to update its location by a notification, for example, with the network. With a fixed mode coordinate system, the coordinates on the earth are fixed to be exactly the same over time, enabling the CN 130 to communication with this area consistently, and UE 110 to be in communication at the particular coordinate area. However, because satellites like satellite 702 move relative to earth, the gNB 120 has to ascertain which satellite (704) is moving into the area to deliver data over it.

In the NTN system 710 the beams are moving with the satellite, and thus the movement of the satellites 702, 704 need to be determined at the gNB 120. If the coverage itself is not for the entire area that the satellite is covering, but may be partially covering, then the gNB 120 has to know exactly when and what point the coverage can happen such as by talking to a different gNB so that a message can actually be delivered over the area. Once the satellite (e.g., 702) reaches a particular threshold (where the UE 110 operates within its beam coverage area), and cannot detect any beam strength measurements, it can move to a different zone and another satellite 704 beam will take over the coverage area. NTN 710 is called "Fixed Earth" beams/cells because the satellite 702 or 704 here is at a period of time always covering the same coordinates that the tracking area (TA) is mapped onto. It never tries to move its beam because the satellite itself continuously adjusts so the beam is always forming in these coordinates.

For example, in the coordinates of a particular city (e.g., Toronto), the satellite is always trying to concentrate on the geographical locations of Toronto because the TA is mapped onto these geographic locations on the Toronto coordinates and at a point where an angle of incidence (AOI) of the beam is reasonable for all the UEs 110 at system 710 is the point of configuration and the satellite will continue to hold as it moves by, only to cover the Toronto area. Once an incidence of angle goes below a certain value, or particular threshold, the satellite will change its concentration so that it has a particular concentration on one coverage area at each TA. Once the satellite moves out it, tries to change the direction of the beam directly onto another coverage area to a different place based on a different tracking area TA.

The NTN system 720 includes earth moving coordinates where along with the satellite 702, 704 moving, the beam itself is moving, which, for example, can be in the same area as the example above (e.g., Toronto). As illustrated at 720, the satellites 702, 704 are moving and their respective beams 730, 740 are continuously moving along with them. While satellite 702 with beam 730 is eventually covering only a part of the coverage area (represented by the rectangle area), an incoming satellite 704 is supposed to cover the remainder area with its beam 740.

Based on the type of architecture that a core network 130 is communicating with, the signaling load can drastically vary, thereby potentially overloading the network resources differently. For example, in fixed cases (e.g., NTN system 710), the beam 740 is concentrating in the coverage area 716 (e.g., Toronto, as represented by the rectangle) until the point the certain AOI changes. Until then, because the UEs 110 are connected on this beam 740 initially, all the signaling is happening on the beam 740 and all the backend communication between the core 130, the gNB 120 and with this satellite 704 is happening with the satellite 702. Once the satellite coverage changes all the communication including the communication between the devices on the core has to be updated to whatever the satellite 704 and gNB 120 is. Below the NTN system 710, is a resulting signal pattern of the signaling traffic for the satellite change in the backend communications of the system for the core network 130. At the point where satellite 704 is incoming and taking over the beam 740 of satellite 702, two relatively big spikes occur in the signaling traffic because all the UEs 110 within that cell coverage will now immediately have to shift over to the a cell that is being covered with the incoming satellite 704. The spikes associated with beams 740 and 730, respectively, as solid and dotted, include beam registrations happening on the first satellite 702 and another in signaling registration is happening on the satellite 704. In the order of tens of thousands or hundreds of thousands of devices 101, perform a deregistration and then a registration around the same time cause drastic spikes in backend traffic. The regular traffic that happens today is basically the terrestrial node (TN) average (TN Avg.), for example, causing a signal capacity beyond which the normal placing of the gNBs 120 themselves is done; and some gNB 120 have definitions, based on how many devices the gNB can handle.

The second scenario with the moving beam NTN system 720 instead of spikes being generated in the signaling traffic, when the beam is shifted from beam 740 of satellite 702 to the beam 730 of satellite 704, all the devices 110 can be more continuously observed in an intermediate coverage area where one UE may be losing connectivity with some registration signaling and the UEs coming into the coverage of 730 will also receive some registration signaling as a part of such handover (HO) or beam redirection. Instead of the big spikes in signaling traffic there is a more gradual burst, but still much higher than the TN signaling average in the backend, even though not a drastic spike.

In all these cases, the UE 110 has to generate a lot of traffic because it has to lose connectivity with an old gNB (e.g., 122-1), and it has to establish connectivity with the new gNB (122-2). As with the Low Earth Orbit satellites, typically around 200 to 300 of them could be utilized and information on where the satellite is located, a particular time of day it arrives relative to latitude/longitude on earth can be stored in a very deterministic data base, in which the network can utilize to perform operations in the backend where the entire signaling on the network can be reduced. However, being able to continue to utilize the UEs 101 without having as much, if any, disruption in the signaling traffic and still not generate these signaling spikes or these continuous heavy backend traffic burst beyond the TN Avg of all the heavy signaling traffic between the UE and the network is essential for maintaining communications, especially throughout the handover processes discussed here.

Figure 8:
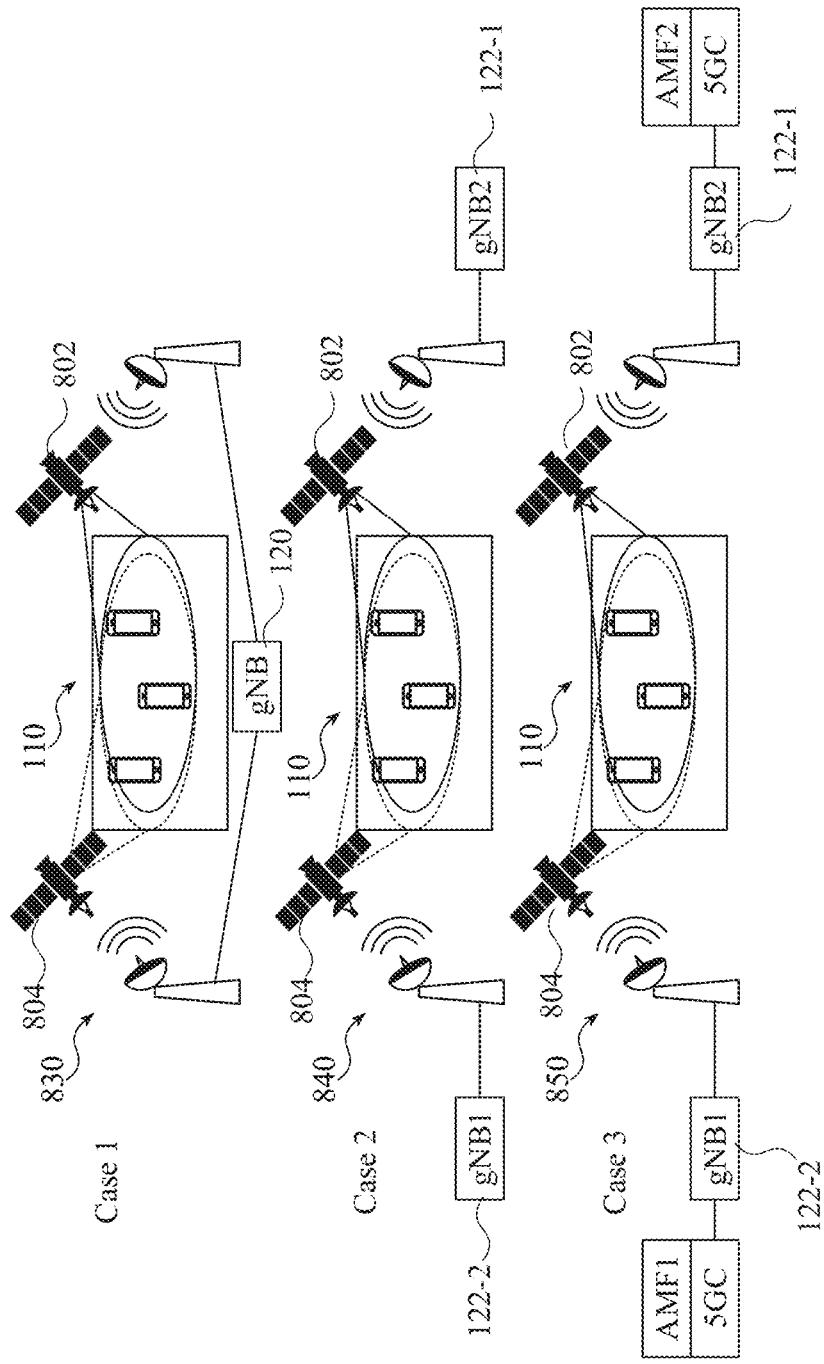
FIG. 8 illustrates diagrams of other example NTN architectures of beam coverage and network architecture for a pair of satellites, in connection with aspects discussed herein.

Referring to FIG. 8, illustrated are example NTN systems architectures of beam coverage and transparent mode network architecture for satellites, in connection with various aspects discussed herein. Architectures 830-850 illustrate different deployment configuration on NTN. Architecture 830 illustrates an NTN Transparent Mode Architecture with both satellites being connected to/on a same gNB 120 being linked to multiple gateways, as well as a same AMF or core network component. Architecture 840 illustrates an NTN Transparent Mode Architecture with both satellites being connected to/on independent gNBs (122-1, 122-2), as well as a same AMF or core network component. Architecture 850 illustrates an NTN Transparent Mode Architecture with both satellites being connected to/on independent gNBs (122-1, 122-2) and being connected to a different 5GC for each satellite.

Due to the transparent mode architecture, existing backend nodes can be used for handovers. In cases of on-board gNBs, an Xn interface based or ISL interface switch link could be utilized, in which the call flow could be similar to today for basic mobility scenarios with as little change as possible and similar to both fixed or mobile beams for ease of adoption. A solution to the handover spikes or burst discussed with respect to FIG. 7, could be for the different nodes to exchange the UE and the mobility profiles information currently on the fixed earth co-ordinates for each of the architectures 830-850 while utilizing the ephemeris information of the satellites to create an advanced mobility configuration. This information exchange would reduce the amount of unnecessary signaling between the UEs and the network. Regardless, in all aspects, the following cases are considered herein: Case 1 (Architecture 830)—Both satellites are on the same gNB and same AMF; Case 2 (Architecture 840)—Both satellites are on different gNBs and same AMF; and Case 3 (Architecture 850)—Both satellites are on different gNBs and different AMFs/SMFs/UPFs.

In the first satellite NTN architecture 830 (Case 1), a beam redirection from an outgoing (or source) satellite node 802 to the new incoming (target) satellite node 804 is demanded. However, individually indicating to each of UEs 110 would be resource and latency constraining. A problem with the downlink control information (DCI) messages today is individually every UE 110 must get its own DCI message in order to re-point itself for communication back to the particular satellite. In terrestrial nodes, the beams are managed in a way so that if there is a UE here and UE here, and the new beam is being directed toward this UE and then the gNB 120 sends a message of a signaling layer 1 to trigger re-direction of the antennas to a beam point, in which based on that a group pointing can be obtained.

In an aspect, the gNB 120, the DU 642 (on-board satellite or ground based), or other gNB/core network component can be configured to initiate a beam redirection from the first satellite 802 to a second satellite 804 for the UEs in the NTN based on a group configuration message of a downlink control information (DCI). The DCI can be an RRC signaled group configuration message that initiates all of the UEs 110 (e.g., over one hundred) to concurrently transfer communication to an alternate beam of the second satellite from a beam of the first satellite based on the initiated beam redirection by the gNB. The group configuration message of downlink control information is then provided to the UEs 110, such as by a broadcast or multicast signaling.

In an aspect, a group DCI message as the group configuration message be configured to trigger the UEs 110 concurrently, together, simultaneously, or at about the same time to move to an alternate beam of the incoming satellite 804. The group configuration message or group DCI can be configured based on UE inputs on beam strength measurements, for example.

Alternatively, or additionally, the group configuration message can be generated without any UE inputs, or UE measurement report. The group DCI message for Earth Fixed beams can be sent in response to the angle of incidence for the source satellite 802 changes or satisfies a particular AOI threshold, for example, or a threshold related to another beam parameters indicating that communications need to be handed over to either an incoming satellite 804/other gNB (in part or completely, satellite eon-board or grounded) or a beam redirection occur to keep signaling traffic at a minimum and communicates seamless.

In an aspect, the group DCI message for Earth Moving beams can be sent in response to at least a partial overlap of the two beams of satellites 802, 804 being identified. Alternatively, or additionally, the network can additionally use ephemeris information to exactly determine when the beam change should be facilitated proactively, and provide the trigger to do so in the group DCI message through an ephemeris database or ephemeris information measured/obtained. This removes the feedback from multiple UEs 110 around the same time when the handover happens. Ephemeris data will also show that a large number of UEs are moving and such UE mobility information be considered in the decision to trigger the group handover to the incoming satellite.

In the second satellite NTN architecture 840 (Case 2), both satellites are on-board, connected to, or associated with different gNBs 122-1, 122-2 and a same CN 130 or AMF as a CN component 132. A handover call flow can have any particular UE 110 perform measurements on the network signal strength and provide the measurement report to the source gNB (e.g., gNB 122-1). Then gNB 122-2 associated with the incoming satellite 804 becomes the target gNB for which all the UEs 110 have to move. This can require a lot of registration information or further messaging, where a message is directed by the core and the core has to know all the UEs 110 at this particular point in time have to be moved from the source gNB 122-1 to the target gNB 122-2. As such, the handover (HO) call flow is at least partially initiated by the UE or partially base on the UE, in which the UE 110 sends measurement(s) to trigger the gNB 122-1 to further process the HO or HO request brought on by the UE 110. The source gNB 122-1 sends a handover message system, prepares everything in terms of how to handover the traffic to the target 122-2, sends a reconfiguration message indicating to operate with the target gNB 122-2 and where to direct communication to. The random access procedure and following call flows can then be set up at the target gNB 122-2, and the target gNB 122-2 receives a message indicating that a UE applied this configuration that the source 122-1 sent it, because communication is established between the UE and target gNB 122-2.

In an aspect, the source gNB 122-1, upon knowing when the new incoming satellite 804 is coming can already initiate computing a decision directly on its own for a handover decision and initiate a beam re-direction. The gNB 122-1 can prepare configurations for all the UEs 110 in that cell and the entire HO procedure. As such, at an appropriate time the gNB 122-1 can provide the group configuration message with DCI for HO to all the UEs 110 together that are within the coverage area of the outgoing source satellite 802.

In an aspect, source gNB 122-1 can generate the group configuration message of DCI with just the target gNB 122-2 information in order to save lots of processing and signaling traffic for network capabilities. Once the group configuration message is sent over to the UEs 110, these UEs 110 all apply the new configuration without necessarily sending a response.

Figure 9:
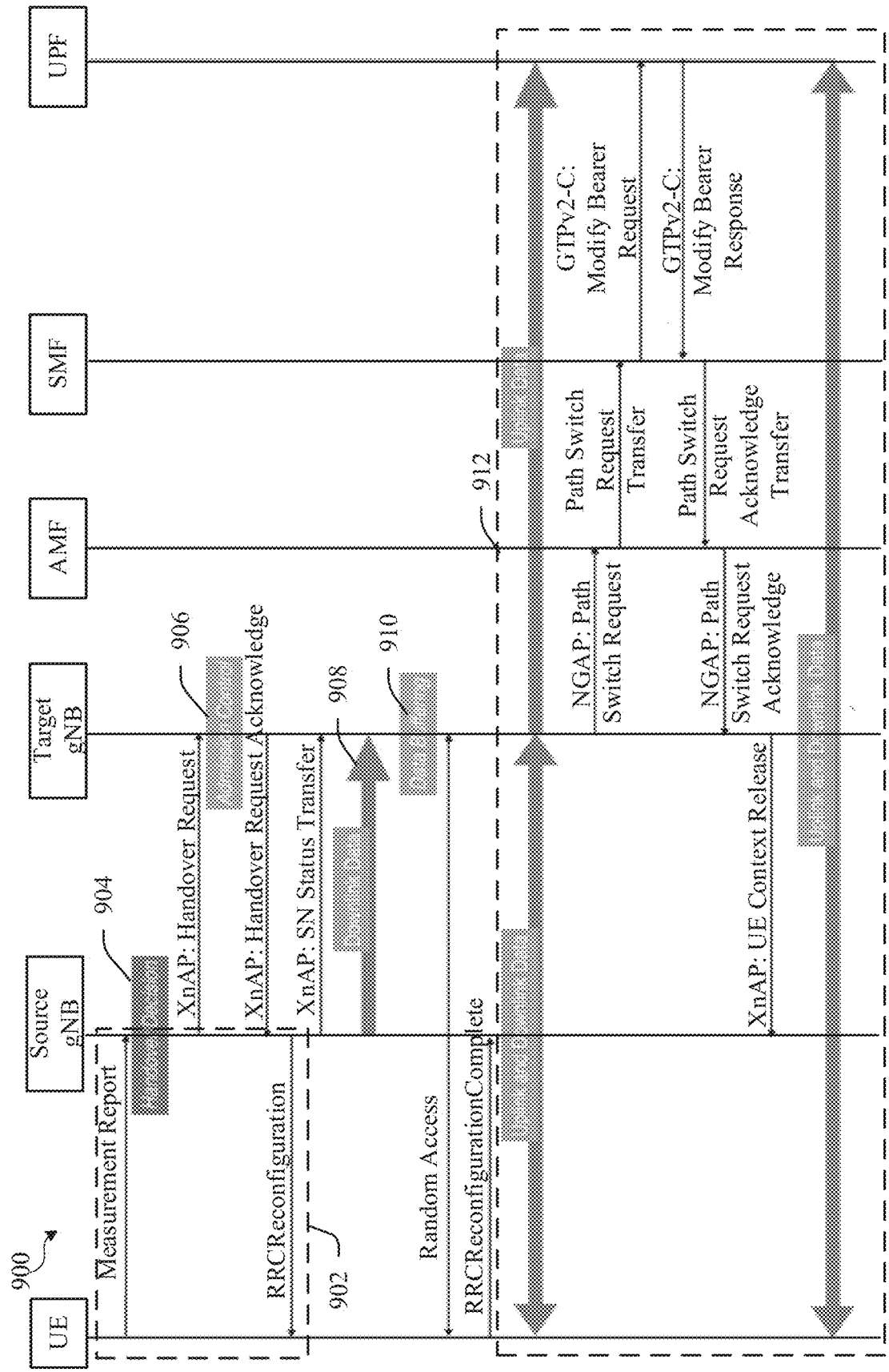
FIG. 9 illustrates an example call flow of an Xn-based handover procedure, in connection with aspects discussed herein.

In an aspect, the HO can be similar to an Xn handover, without a real need for performing the entire operation as illustrated in FIG. 9 infra. Handovers in this scenario can be restricted to a lighter (than current terrestrial Xn handover) procedure to ensure that ephemeris data can be utilized in order to move the UEs on the incoming satellite beam. UE measurements can be an added feature for better gNB guided handover procedure but are not absolutely needed. The measurement step can be avoided to provide more resources to the networks in order to support a more successful group handover. Though a DCI can be used, the configuration of the target gNB 122-2 can be utilized alone in order for the group handover to be complete.

For the earth fixed beams, the HO process can lead to a major migration between two gNBs meaning the target gNB 122-2 should be able to handle this additional incoming handed over traffic. As such, the capability or definitions established with the target gNB 122-2 can be a consideration factor in the source gNB 122-1's preparation of the UEs 110 for receiving the group configuration message. For the earth moving beams, the migration of UEs 110 between gNBs can be more gradual and will cause gradual additional load on the target gNB 122-2 without such consideration. In the backend, the gNB 122-1, for example, can further update the core 120 with the cell ID of the new gNB 122-2 onto which the UEs have moved for efficient paging to take place.

Referring briefly to FIG. 9, illustrated is an example call flow 900 for Xn-based HO procedures, as a 5G handover procedure. At 902, as the UE sends the measurement reports and the source gNB detects that a handover is required and makes an HO decision 904; then it connects with the target gNB to start a switch. This includes the XnAP: Handover Request, admission control 906 of the target gNB, an XnAP: Handover Request Acknowledge to the source gNB from the target gNB, an RRC Reconfiguration to the UE from the source gNB, and then an XnAP: sequence number (SN) status transfer to the target gNB from the source. The source then provides a downlink of data 908 to the target that performs data buffering 910. The UE further processes a handover with a random access and connects to the Target gNB with an RRC Reconfiguration complete to the source, while already switched communication tunnels to the target gNB. The NG-RAN sends the UE Notification message to report the current RRC state for the UE (i.e. RRC Inactive state or RRC Connected state). The current UE location information (i.e. traffic area identifier TAI+Cell Identity) is included when RRC state information is reported. Then the backend call flow continues at 912 for switching or modifying the backend CN components when keeping the AMF and modifying sessions with bearer requests and responses.

Figure 10:
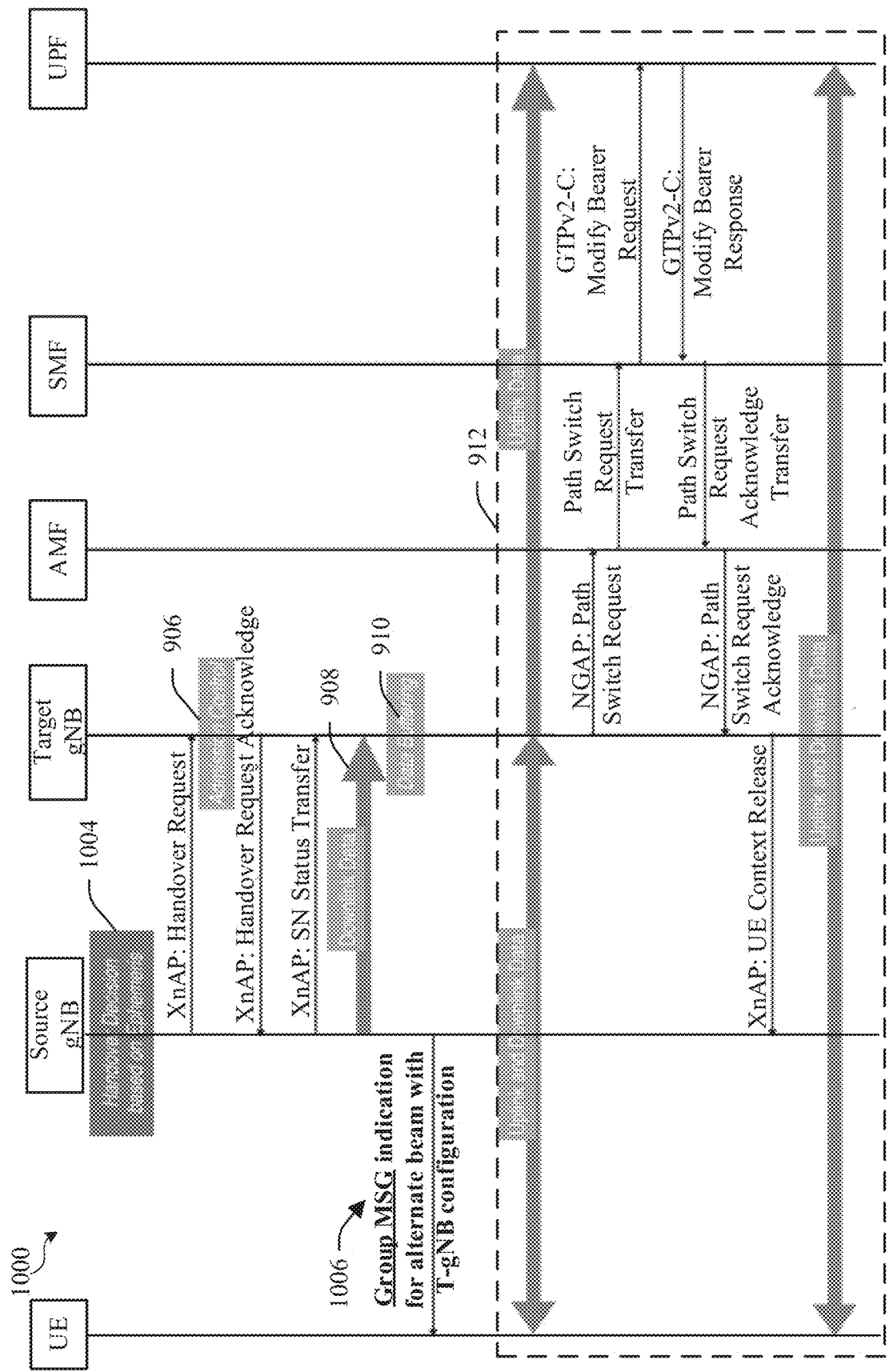
FIG. 10 illustrates an example modified call flow of a handover procedure for NTN operations, in connection with aspects discussed herein.

FIG. 10 illustrates a modification of 5G HO call flow 1000, in which the source gNB 122-1, upon knowing when the new incoming satellite is coming can already initiate computing a decision 1004 directly on its own for a handover decision and initiate a beam re-direction based on ephemeris information. The gNB 122-1 can prepare configurations for all the UEs 110 in that cell and the entire HO procedure. As such, at an appropriate time the gNB 122-1 can provide the group configuration message with DCI for HO to all the UEs 110 together that are within the coverage area of the outgoing source satellite. The target gNB (T-gNB) configuration can include the cell ID of the target gNB in order for the UEs 110 to redirect their communications/antennas thereto.

Referring briefly back to FIG. 8, the NTN architecture 850 includes: Case 3—both satellites 802, and 804 are on different gNBs 122-1 and 122-2, respectively, and different CN components such as different AMFs/SMFs/UPFs (e.g., AMF1 and AMF2, etc.). Here, rather than just acquiring information about neighbor nodes, the gNB in transparent mode information from hundreds of miles away, at much farther distances than neighboring cells, can be obtained for making decisions regarding HO operations and cell coverage areas with the UEs 110 together in preparation of HO by the source gNB. This can be configured through inter-satellite communications, between satellites since the gNBs are on-board the satellite at least in part.

In an aspect, the information of the UEs 110 on one cell has to be updated with the core network (e.g., primarily at the AMF→SMF→UPF) so that paging works efficiently. As such, a modified group N2 handover procedure can be configured that is applicable to both idle and connected UEs 110 as RRC IDLE and RRC connected UEs. The source gNB can configure a group registration message for the UEs 110 that is also used in the update procedures. A modified Path Switch Request/Acknowledge response message flow using group schemes where the information about the UE 110 can be obtained from the particular NGRAN using ephemeris information and existing databases to trigger the call flow as opposed to UE measurement reports and RRCReconfigurations. For example, registration message can be a group registration configuration message for the UEs 110 to update registration with a NG core network component for a path switch request/acknowledge response message flow, based on ephemeris data related to the UEs 110.

Figure 11:
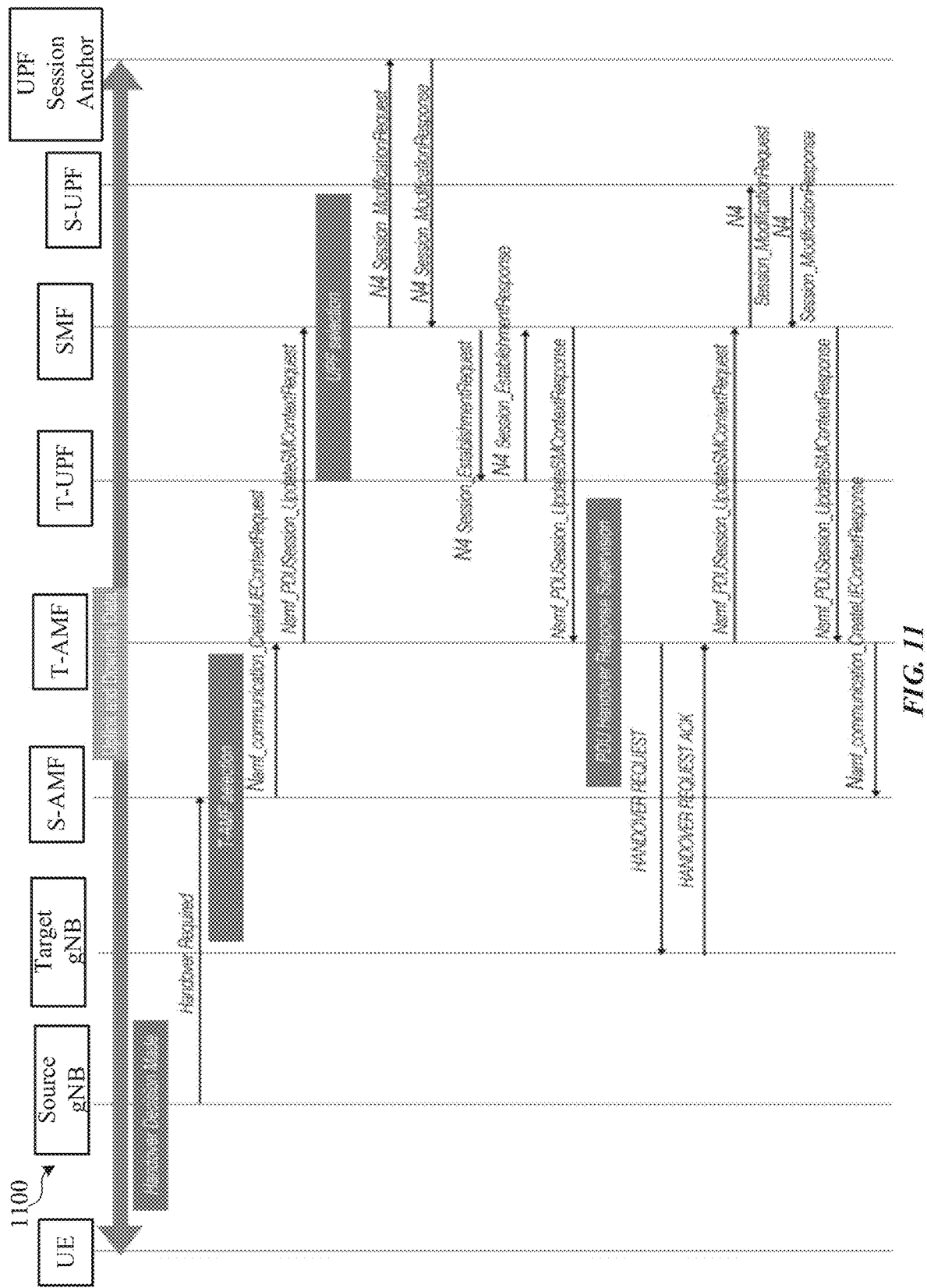
FIGS. 11-12 illustrate an example call flow of an N2-based handover procedure, in connection with aspects discussed herein.

Referring to FIG. 11 illustrated is an example N2 based HO call flow 1100 for preparation phases. Here, UE uplink and sends data along the gNB and core networks to communicate over networks. An HO decision is made by the source gNB, communicates a handover with the source (S) AMF, where a transfer AMF selection is made, and communicaiton to a target (T) AMF in a Namf_communicaiton_createdUEContextRequest message. An Nsmf_PDUSession_UpdateSMContext Request is sent to the SMF, which performs a UPF selection thereafter. An N4 Session Modification Request Is made to the UPF session anchor, which responds with an N4 Session Modification Response. The SMF provides an N4 Session Establishment Request to the T-UPF thereafter, which responds with an N4_Establishment Response. The SMF then provides an Nsmf_PDUSession_UpdateSMContext Response to the T-AMF, which performs PDU HO response supervision and provides an HO request to the T-gNB that further provides an HO Request ACK. The T-AMF provides an Nsmf_PDUSession_UpdatesSMContextRequest to the SMF, which in turn provides an N4 Session_Modification Request (Req) to the S-UPF, further responding with an N4 Session_Modification Response. The SMF then provides an Nsmf_PDUSession_UpdatesSMContext Response to the T-AMF, which further provides an Namf_communication_CreateUEContext Response to the S-AMF.

Figure 12:
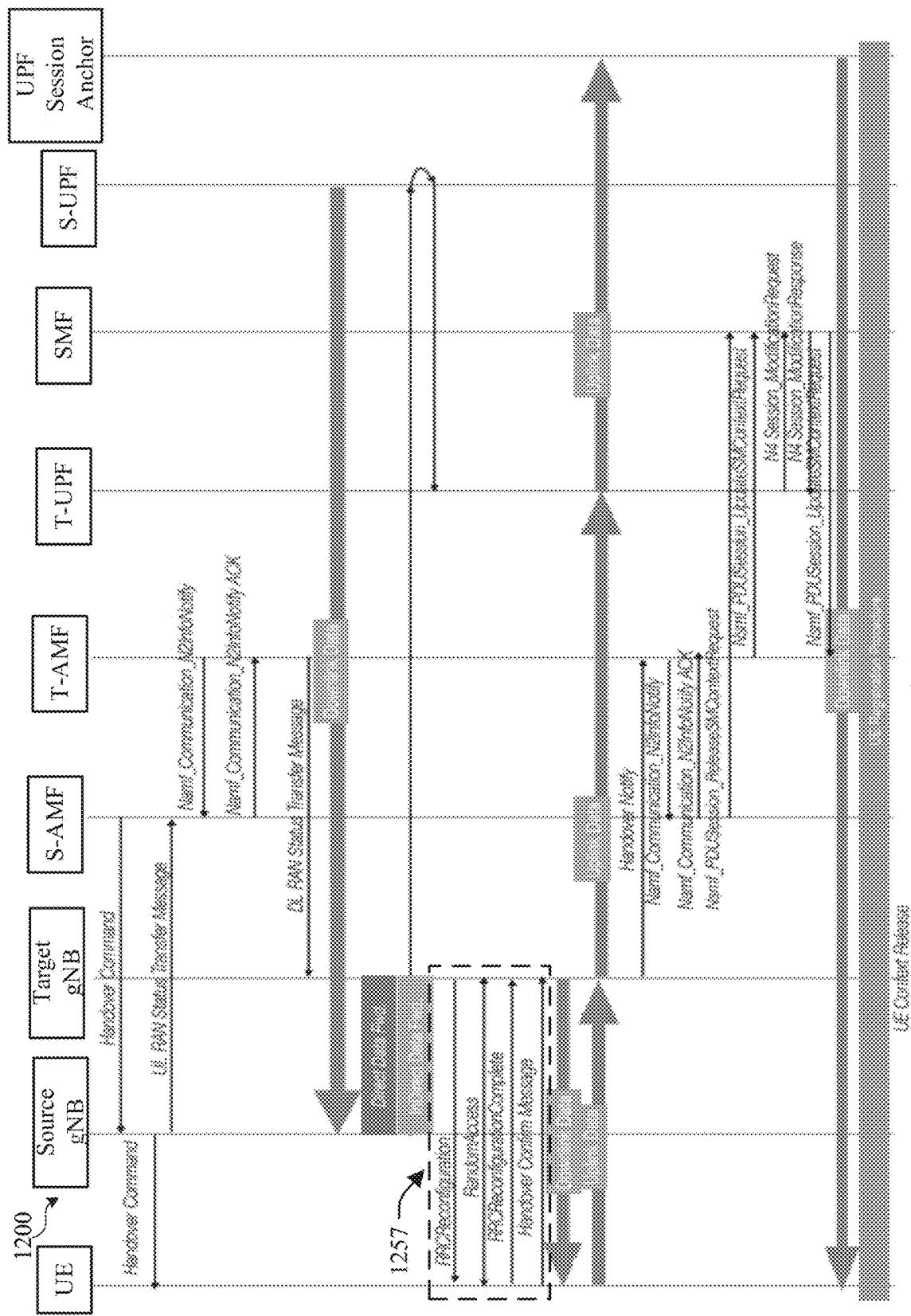

FIG. 12 further illustrates an example call flow 1200 for N2 based HO in the execution phase. The S-AMF provides an HO command to the source gNB, which further provides an HO command to a UE and a UL RAN Status Transfer Message to the S-AMF. Then the S-AMF receives an Namf-Communication_N2InfoNotify to the S-AMF, which in turn sends an ACK. The T-AMF then sends a DL RAN status Transfer Message to the T-gNB, and data is tunneled as DL data between the S-UPF and S-gNB. A direct forwarding of data and indirect data forward occurs between the source gNB and target gNB through the CN components and the T-UPF as shown. At 1257, RRC Reconfiguration, Random Access, RRCReconfiguration complete response and HO confirm messages are transferred between the UE and Target gNB. Data is downlinked and uplinked thereafter with an exchange of notifications. The T-gNB sends an HO notify Namf Communication N2Info Notify to the T-AMF, which sends an ACK to the S-AMF. The S-AMF provides an Nsmf_PDUSession_ReleaseSMContext Request to the SMF and then the T-AMF sends an Nsmf PDUSessionUpdates SMContext Request message to the SMF. The T-UPF sends an N4 Session Modification Request to the SMF, which in turns sends a response, and then an Nsmf_PDUSession_UpdateSM Context Request to the T-AMF. A downlink of data occurs with a UE registration procedure with a UE context release form the S-AMF to the source gNB.

This procedure can be further modified to be able to handle all the UEs 110 in one cell.

In the case of Earth Moving beams, this procedure is invoked frequently and the S-NGRAN and T-NGRAN need to identify the UEs currently in the S-satellite beam coverage and T-satellite beam coverage and do the handovers in the core without having to initiate any or various UE procedures.

Figure 13:
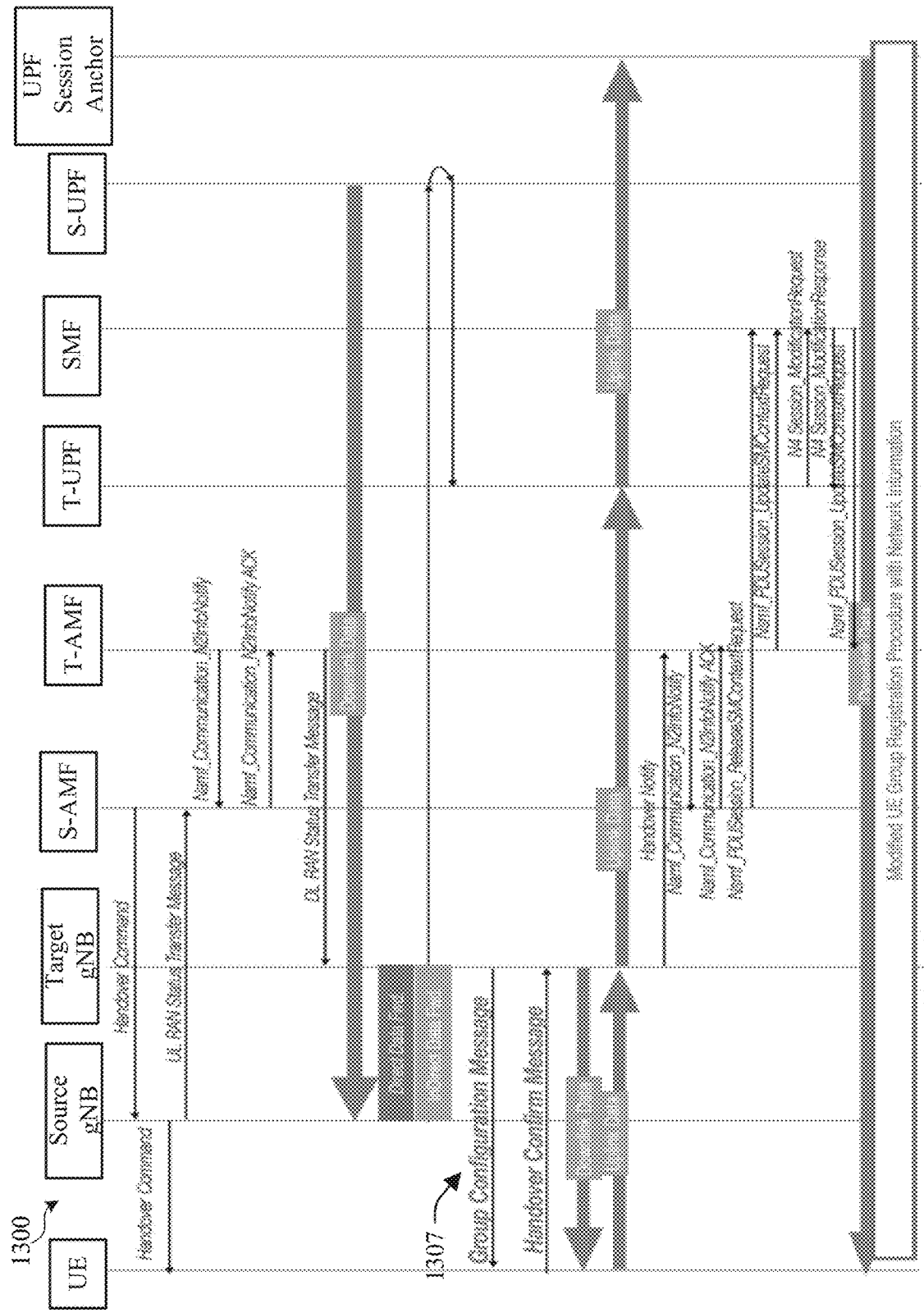
FIG. 13 illustrates an example of another modified call flow of a handover procedure for NTN operations, in connection with aspects discussed herein.

Referring to FIG. 13, illustrated is an example modified call flow 1300 N2 based HO in the execution phase. Here, the messages 1257 of FIG. 12 have been replaced by a group configuration message 1307 with downlink control information. The UEs 110 can then be configured to provide a HO confirm message or not, in which the HO can further flow, thereby eliminating much of the sudden increase in signaling by potentially hundreds of thousands of UEs at each and every satellite HO.

Cell selection and reselection in NTN networks is impacted markedly by the deployment architecture and the high mobility of the satellite nodes.

Ephemeris data as indicated in 3GPP Technical Report (TR) 38.821 Annex A contains the orbital trajectories of satellite networks. The data provides information in terms of Earth relative location coordinates of the satellite position based on time of day, along with other useful information. The information in this database allows for deterministic knowledge of when a satellite will be in viewing range of a UE and when it will not be available. Propagating this information to the UE will be very beneficial to the UE in terms of cell selection procedures, and in various embodiments, this information can be provided to a UE or gNB via one of a variety of techniques (e.g., via NAS, AS signaling, etc.).

The availability of satellite ephemeris data at the UE or gNB can be beneficial for cell selection/reselection on NTN Networks.

In various embodiments, RRC_Idle/Inactive mode UEs can employ additional assistance information (e.g., using UE location information, satellite ephemeris information, additional parameter(s), etc.) for cell selection/reselection involving NTN networks than existing systems. Using an Earth-fixed tracking area can avoid frequent tracking area update (TAU). Various embodiments can provide NTN cell specific information to UEs via System Information Block(s) (SIB(s)) or via other techniques discussed herein.

For example, in RRC connected mode operation, one or more schemes can be employed to address the following issues for NTN networks: (i) reducing service interruption during hand-over due to large propagation delay (e.g., especially for GEO transparent mode architectures, etc.); (ii) addressing frequent handover and high handover rate due to satellite movement (e.g., especially for LEO NTN(s), etc.); (iii) improving handover robustness due to small signal strength variations in regions of beam overlap; and (iv) compensating for propagation delay differences in the UE measurement window between cells originating from different satellites (e.g., especially for LEO NTN(s), etc.).

As another example, additional mobility enhancements may be appropriate to address NTN networks. Additional Conditional Handover (CHO) triggering conditions can be employed (e.g., location/time based, etc.), and measurement-based thresholds and events can be adapted to the NTN environment. Enhancements to mobility configuration can be potentially employed (e.g., to support broadcast configuration, etc.). Enhancements to measurement configuration/reporting can be employed (e.g., pre-triggering based solutions). Additionally, enhancements can be employed to ensure service continuity for mobility from TN to NTN and from NTN to TN systems.

For each of these scenarios (including cell selection/reselection, associated with embodiments discussed herein), the same solutions identified for Earth moving cell scenario(s) can also be applied for Earth fixed cell scenario(s), or different solutions can be applied for fixed/moving scenario(s).

Various aspects of NTN cell selection and reselection are discussed herein. These aspects include the usage of additional available information from ephemeris that the network can broadcast to the UE for improved cell selection and reselection in NTN only scenarios, in connection with various embodiments. Additional aspects and embodiments address cell selection when TN nodes are in the range of NTN coverage, and potential solutions that can be adopted. Additional aspects discuss the case of cell selection and reselection that covers international boundaries.

Additional Parameters for Cell Selection and/or Reselection in NTN

Section 7.3.1.6 of TR 38.821 discusses the possibility of using ephemeris data and UE location information for cell selection and reselection. Using its location and ephemeris data, the UE can calculate with a certain degree of accuracy additional parameters such as satellite configuration (LEO, GEO etc.), the distance to the satellite, elevation angle or some additional parameter(s) that can aid in cell selection criteria. Considering the potential inaccuracies in determining these parameters and potential problems in transmitting the entire database to the UE in either a pre-loaded form (through uSIM) or through SIB (due to the overhead) based broadcasts, it would be beneficial if the network includes these additional parameters of satellite mobility and coverage information in some format to the UE in initial cell selection broadcast information. Additionally, UE location information calculations can lead to power constraints on the UE while generating privacy constraints if provided to the network. Even though location information cannot be excluded, it would be extremely useful for the network to provide ephemeris data and a relevant offset to the UE.

Accordingly, in various embodiments, the non-terrestrial network can provide additional measurement offset information (e.g., based on ephemeris, etc.) to UEs for improved cell selection and reselection.

A similar precedent that exists currently for such network-based offsets to UE for cell selection/reselection is with High Speed state parameter in System Information Blocks (SIBs). This would help solve the problems for not only stationary UEs in NTN networks but also for UEs which can be highly mobile (e.g., with speeds up to 500Kmph as agreed in the 3GPP Radio Access Network (RAN) Working Group 2 (WG2) (RAN2) meeting #111-e Chairman's comments). As an example, various embodiments can employ new SIB2 parameters for offsetting configurations such as GEO, LEO or HAPS in a similar format as HighSpeedStateParameters. For the case of cell reselection, these additional parameters can be added to the event-based A or B measurement configurations.

Accordingly, in various embodiments, new offsets discussed herein can be added to existing broadcast mechanisms and measurement configurations to enhance UE cell selection and reselection in non-terrestrial networks.

Alternate parameters that can be employed in various embodiments comprise one or more of a distance to a satellite, cell load, quality of service targets or requirements, an elevation angle, a time of feeder link change, a common delay, a differential delay, a UE speed, or a UE movement state.

Distance to a satellite or related information can aid cell selection/reselection. In various NTN configurations (e.g., where both GEO and LEO satellites exist, etc.), a distance or indication of the satellite configuration would help the UE choose the satellite with the least propagation delay. Networks can also prioritize the satellite configuration based on cell load, quality of service needed by the UE application or various other criteria for re-selecting between GEO, LEO, etc., or terrestrial nodes.

Elevation Angle is an alternate parameter that can be used to identify the most suitable network configuration, similar to distance.

Feeder link change (e.g., ephemeris based), if indicated sufficiently ahead of time, can allow for better selection of cells based on time of satellite change. For example, if there is very little dwell time available on the current satellite and the incoming satellite is close, an idle UE might be better off connecting to the incoming satellite, as opposed to the existing one.

Timing parameters such as common and/or differential delay or configuration (latency) based parameters can allow for a configuration based on the SIB-provided common delay, and also, in some embodiments, provide for the UE to select a link based on QoS targets or requirements.

UE can also be a useful parameter. For cases where mobility on the UE is involved (e.g., especially in cases such as enhanced Mobile BroadBand (eMBB) scenarios in an airplane or high-speed train with relative velocities of 100 Kmph or above), the UE speed relative to the satellite speed can be a relevant parameter.

In various embodiments, these additional parameter(s) can be provided to the UE for utilization in any of a variety of ways.

Scenarios where these parameter adjustments can be advantageous is where multiple NTN configurations might overlap with one another. One such example scenario is where a GEO configuration might overlap with a LEO configuration of the same operator.

As suggested by the above example scenarios, 3GPP NTN does not preclude deployment scenarios where multiple NTN configurations might be overlapping over one another.

In such situations, currently there is no way for the network to indicate which of the two configurations are to be prioritized to the UEs unless using frequency. But using frequency prioritization might not always yield the best scenario in this case, because of the transient nature of LEO. In such situations, a prioritization integer between different NTN configurations would be highly beneficial to UEs both from a measurement perspective and performance perspective. Accordingly, in various embodiments, a prioritization field can be signaled to the UE to indicate a priority associated with or between NTN configuration(s). The prioritization field becomes even more useful when there are terrestrial neighbors to these NTN cells as explained in greater detail below.

Accordingly, in various embodiments, for NTN(s), an intra-NTN prioritization flag can be employed aid in UE cell selection and cell reselection.

Various embodiments can employ a prioritization flag and/or camping order that can help a UE choose the best network and avoid ping pongs (frequent reselection) between TN and NTN networks.

In the cases of mixed coverage areas, one issue that can be seen by UEs is that the large coverage areas of NTN will lead to tens and even hundreds of potential terrestrial neighbor cells. TR 38.821 proposes to use UE location information to identify the zone the UE is present in and use reselection based on the location identification. However, this is power consuming, since the UE needs to continuously monitor its location in order to identify if it is in or out of a particular fixed or mobile beam. Thus, location based reselections lead to power drain on the UE in regular cell selection and reselection scenarios. Accordingly, in various embodiments, a beam-based neighbor cell list can be provided for NTN UEs, so as to avoid the penalty of location measurement related power drain.

While location information is power expensive for regular cases of cell selections and reselections, it is very useful at international boundaries. With existing terrestrial networks deployments, cellular radio waves can be controlled in a way where they do not penetrate deep into the roaming country. However, in satellite networks with large cell sizes, such restrictions cannot be applied easily. In such situations, geolocation-based advertisements of home and roaming cells can be very useful, and such information can be broadcasted to the UEs so as to ensure that satellites can limit the coverage and form boundaries between home and roaming country networks. Satellite ephemeris data can aid the network in ensuring that the broadcast of additional information to the UE can be done when the satellite approaches the location boundaries or when the beams start to cross the international boundaries as the case may be.

NTNs cannot easily form international boundary demarcations unless they are of a multi-beam configuration and beams are narrow. Accordingly, at international boundaries, in order to mitigate the effects of large cell size, the network can broadcast (e.g., using ephemeris data) the geolocation boundaries of home and roaming cells to the UE in order to ensure effective cell selection and reselection.

In other aspects, group messaging can be configured in cases of topology adaptation scenarios for Integrated Access Backhaul (IAB) nodes (i.e. for exchanging between network nodes only) for Rel-17 3GPP eIAB. This aspect of group messaging is useful in multiple other scenarios and need not be limited to IAB nodes either. In situations such as Multimedia Broadcast Multicast Service (MBMS) or mobile gNBs (NTN networks and mobile IAB nodes) messaging more than one UE at a time by the network can be configured and useful as discussed herein, including moving or handing over a group of UEs from Broadcast to Multicast dynamically. Such a handover of a group of UEs from one mobile gNB to another could be dynamically to take care of signaling storms etc.; message a number of NBIOT devices at once (with or without responses). In most such situations of mobile gNBs, the network configuration changes happen quite frequently (ex. For LEO satellites the visibility duration to UE is between 5-20 minutes) leading to a large amount of signaling in terms of messages and their corresponding responses every time the satellite node changes. This is especially true if the satellite architecture uses either earth fixed or earth mobile satellite beams ■ For such situations a common broadcast or multicast signaling scheme/framework is needed to ensure that all CONNECTED, INACTIVE and sometimes IDLE UEs move to a common network configuration and resume the operations based on the target network of the target gNB.

Multiple possibilities as aspects can be satisfied for group messaging in 3GPP: A: configuration messages can be sent to all the UEs in the group making some kind of a feedback mechanism or secure guaranteed delivery mechanism; B: Capacity constraints arise especially with NTN and IAB nodes in play as there will be a need to handle larger amount of signaling response traffic (ACK storms), especially when an ACK based scheme is chosen due to the large cell sizes. In another aspect, an ACK-less group messaging scheme can be configured according to various aspects herein.

Figure 14:
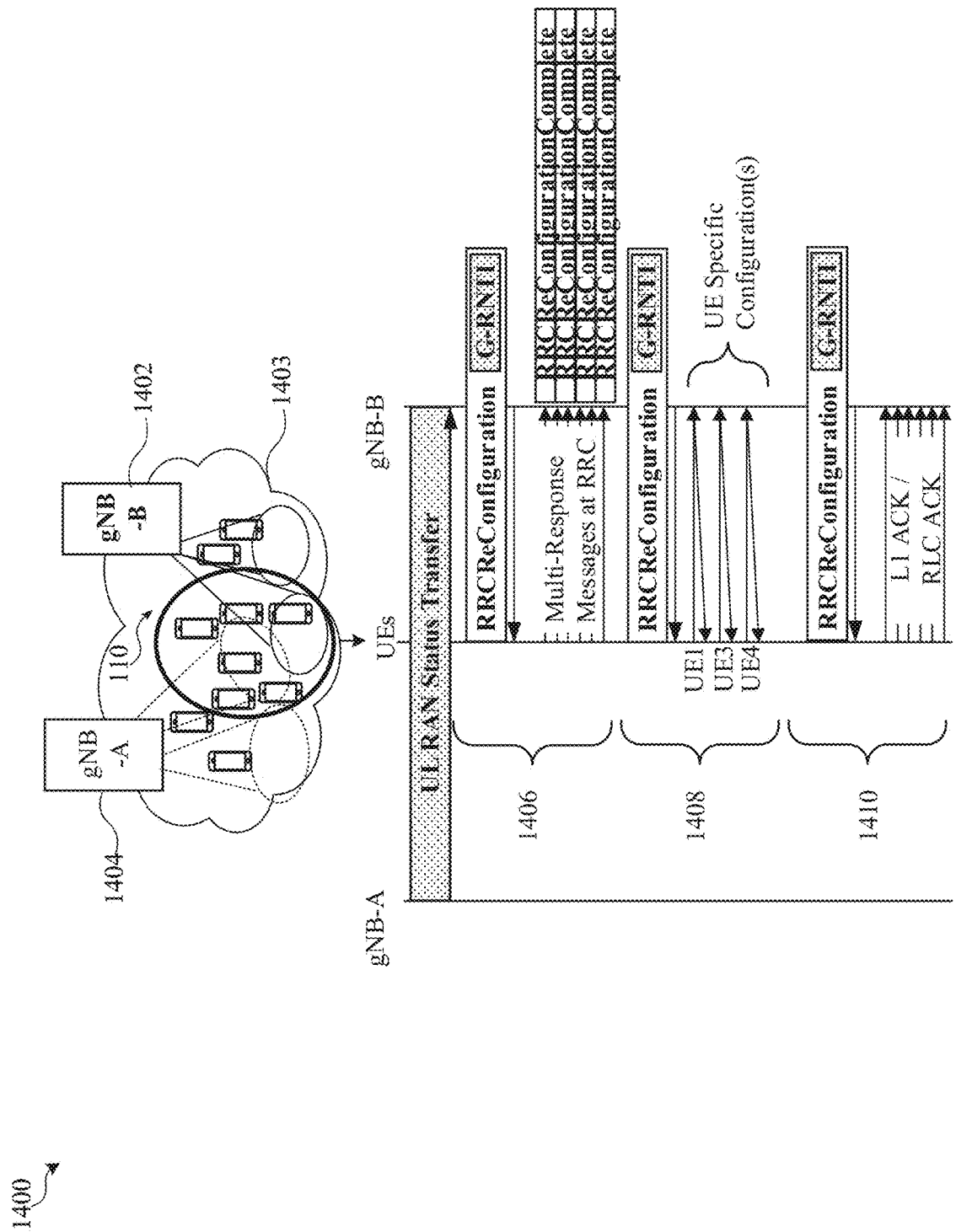
FIG. 14 illustrates an example of a group messaging call flows of a handover procedure, in connection with aspects discussed herein.

Referring to FIG. 14, illustrated is an example satellite based NTN system as a gNB-A and a gNB-B, which can be g-NB satellites or gNB on-board nodes in transparent mode architecture as discussed herein, or fully integrated in an NTN network. Different embodiments, for a group based message such as the group configuration message with control information can be configured via the gNB or processed by the UEs for reception via broadcast or multicast communication.

FIG. 14 includes varied aspects considering an ACK based message for RRC, in which a broadcast/multicast configured RRC group messages from the control node (IAB Donor/Parent/NTN satellite/MBMS CU etc.). This ACK based G-RNTI RRC Message can be problematic when 100s of devices are present. So, a modified G-RNTI based RRCReConfiguration message can be configured in the call or process flows.

In an aspect, a group radio network temporary identifier (G-RNTI) can be utilized to encode and decode the group configuration message discussed herein. This can be provided for reconfiguration operations, which is illustrated at the set of operations or call flows 1406 between UEs 110 and gNB-B 1402. Here, each UE can provide an individual response so that there are Multiple responses messages as RRC Re-Configuration Complete.

In an aspect, the call flows of 1408 include specific UEs of UEs 110, which are given a random access identifier so that together they can recognize their identity (ID) in the RRCReConfiguration message as in the call flows of 1406. Each UE individually can send out a response or not, and this can be configured in an MBMS network, for example. Any UE within the cell area 1403 may apply the message with the identifier or G-RNTI, but if there are any differences between the current configuration a UE has and the new configuration coming in as a group, then individually each UE can be configured to ensure that any specific individual configuration is taken care of by responding in return. Thus, signaling traffic can still be mitigated while considering independent UE situations without requiring response from all UEs in the coverage area. The call flows 1406 are also an example of a RRC Re Configuration message as a group RNTI message for configuration with DCI based on the G-RNTI such that if 500 UEs, for example, obtain a group RNTI message, each can respond individually as in 1406, but need not in 1408. Thus, only those that may think they may need a special configuration to taken care of, only those UEs of UEs 110 respond by sending that configuration in as UE Specific Configuration response.

Another aspect can be seen at 1410, where there is no RRC message that is configured to generate a response, all the UEs apply the constrict and send a single ACK or an RLC level message that is a smaller level of ACK compared to what we is done at 1406. For example, an L1/L2 ACK using a sequence of bits can be performed.

Figure 15:
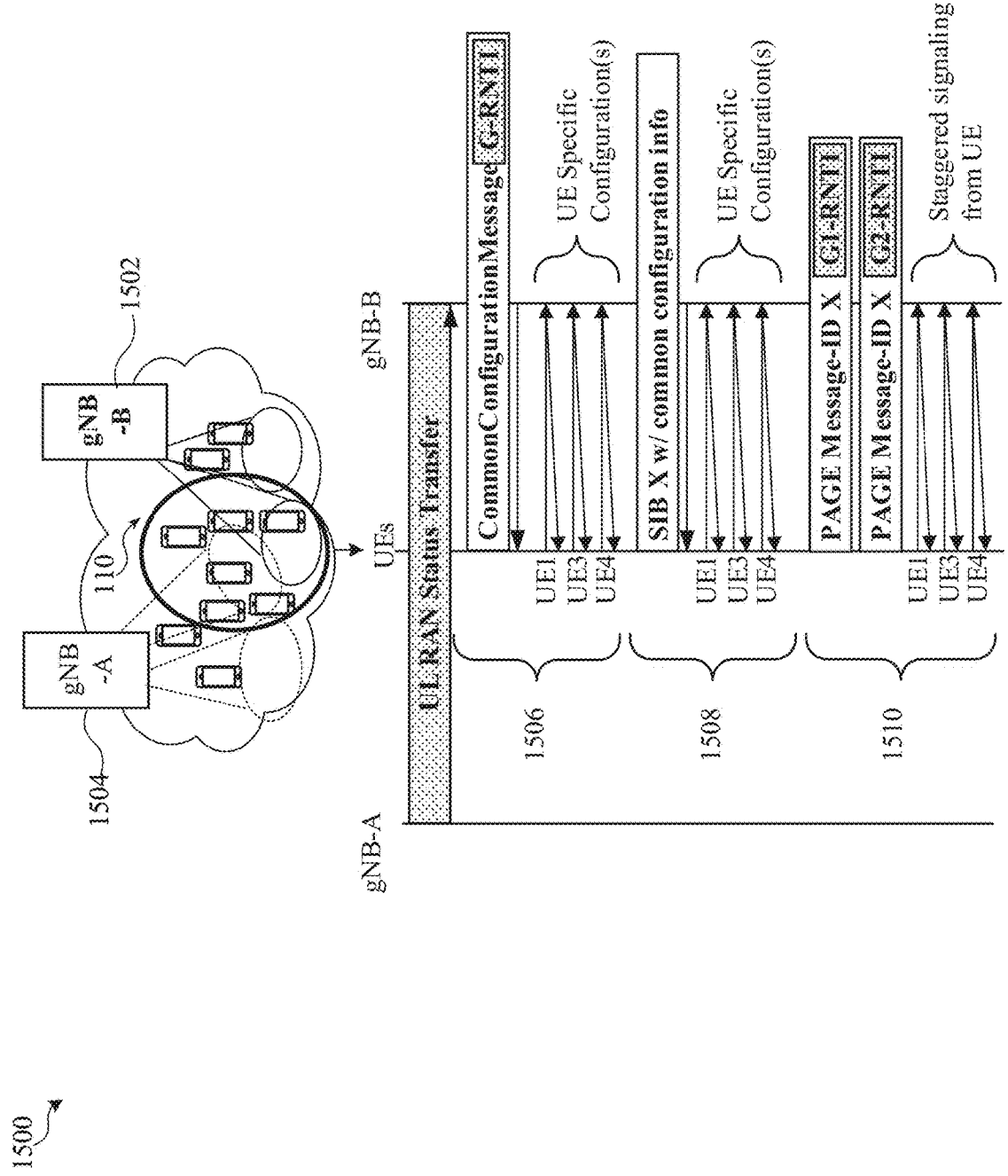
FIG. 15 illustrates an example of a group messaging call flows of a handover procedure, in connection with aspects discussed herein.

Referring to FIG. 15, illustrated is an example satellite based NTN system as a gNB-A and a gNB-B, which can be g-NB satellites or gNB on-board nodes in transparent mode architecture as discussed herein, or fully integrated in an NTN network. Different embodiments, for a group based message such as the group configuration message with control information can be configured via the gNB or processed by the UEs for reception via broadcast or multicast communication. The call flows of FIG. 15 can be non-Acked, ACKless, or without acknowledgment responses being required or triggered, except in specific configuration cases at the UEs.

Here, a common configuration message can be utilized at the embodiment of the call flow 1506. The common configuration message can be configured to handle the connectivity between different nodes (gNB/(R)ANs) and ensure all the UEs of the cell coverage while enabling the UE specific configuration as in 1408 of FIG. 14. The common configuration message can be based on a G-RNTI, for example, in which UEs can decode based on the random access identifier or the G-RNTI.

In other aspects, the call flow 1508 can configure a system information block (SIB) in the group configuration message provided to the UEs discussed herein this disclosure. The SIB can include common configuration information that comprises a target gNB common configuration, which can include the cell ID or related info such as a TA, and automatically be applied to all the UEs 110 for redirection or HO thereto. The SIB configuration can be SIB X for satellite networks and be continuously broadcast in the particular coverage area or the time when an old/source satellite is going out of coverage and new incoming satellite is coming into coverage. Similar to process flows of FIG. 15 and FIG. 14 at 1408, only some UEs would response based on any differences or the need for UE specific configuration with such specific configuration.

In other aspects, the call flow 1510 can configure a page message to the UEs 110 as at least part of the group configuration message. The page message can be provided to some UEs 110, so they get a message for updating their configuration for a new satellite. The page message can be a sequential group page message with a new ID (as an indication to trigger the UEs 110 to request a new configuration) that is transmitted to the overlap area of the coverage areas by both the Source gNB and the Target gNB. This can reduce the peak load and spread the signaling load over time based on UE activity. Like in other process flows of FIGS. 14 and 15, some UEs would apply this configuration and respond back, and other UEs would only apply the configuration. The signaling here can be in a staggered distributed sense of applying the new configuration coming in from the network.

Figure 16:
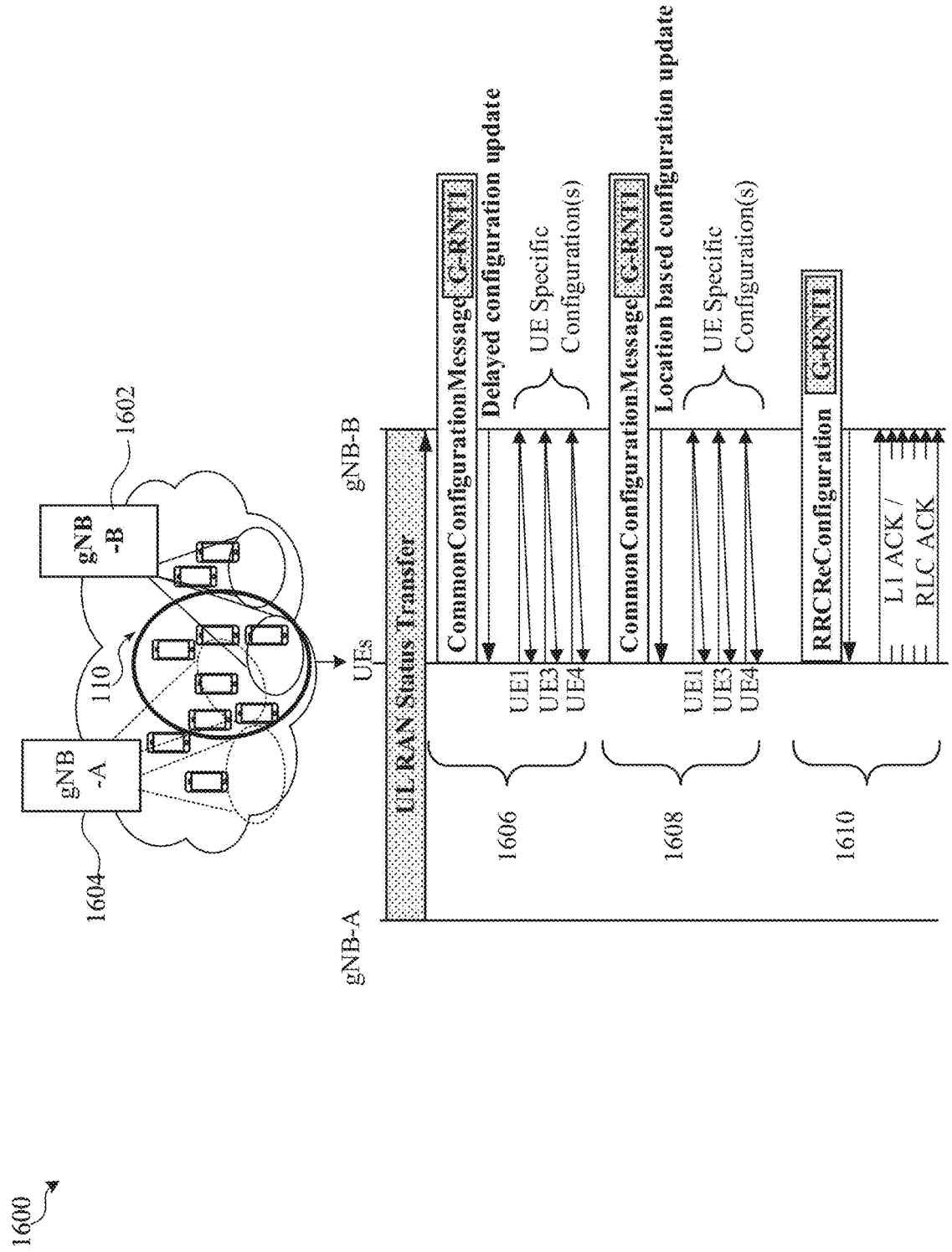
FIG. 16 illustrates an example of a group messaging call flows of a handover procedure, in connection with aspects discussed herein.

Referring to FIG. 16, illustrated is an example satellite based NTN system as a gNB-A and a gNB-B, which can be g-NB satellites or gNB on-board nodes in transparent mode architecture as discussed herein, or fully integrated in an NTN network. Different embodiments, for a group based message such as the group configuration message with control information can be configured via the gNB or processed by the UEs for reception via broadcast or multicast communication. The call flow examples of FIG. 16 can be based on similar aspects as in FIGS. 14-15 with a consideration of delay or storage based aspects utilizing a preconfigured delay timer so that the Common Configuration Message based on the G-RNTI is delayed based on either a period of time after receiving the common configuration message as the group configuration message described herein. The configuration is stored upon reception, and thus applied after the delay provided in the group configuration message at the call flow 1606. At 1608, the delay is based on a location. Upon the satellite reaching a certain location, the UEs 110 can apply the configuration received together or concurrently, just as with the delay timer, but the delay is a location based delay rather than dependent solely on time; both can be configured or considered here also. At 1610, can be applied base don a list of pre-configurations (rather than dynamically signaled) being provided to the UEs 110 based on one or more of a time period, date, or a location of an incoming satellite relative to the UEs themselves.

The call flows 1606-1610 are thus storage based configuration reliant on a delay. The network gNB sends the group configuration message ahead of time because it already knows the data and knows how long the satellite will be in coverage for some x number of UEs and all those UEs 110 can already have been sent previously a reconfiguration (common configuration, or the like group configuration message), in which the UEs will store and just automatically apply at the appropriate time (e.g., at detection of incoming satellite ID).

Figure 17:
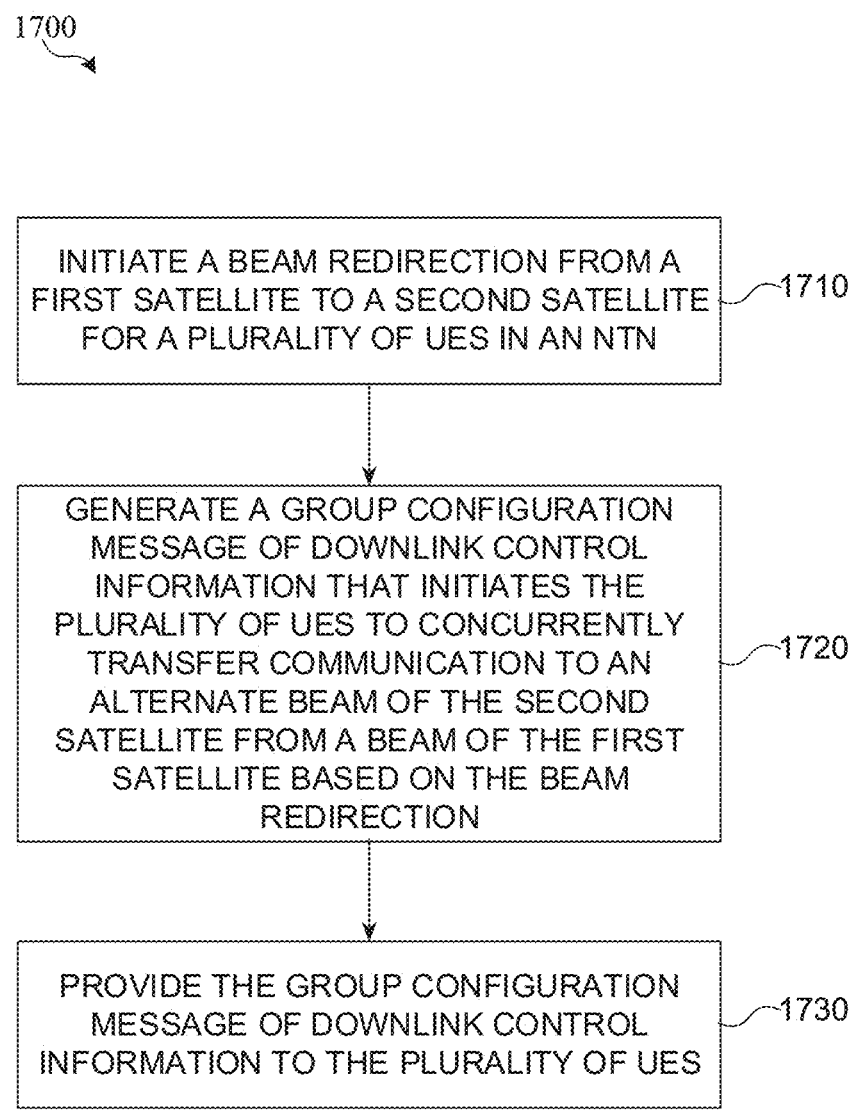
FIG. 17 is another block diagram illustrating an example process flow for NTN handover procedures according to aspects discussed herein.

Referring to FIG. 17, illustrated is an example of a process flow 1700 for group handover of earth fixed and mobile beams in accordance with each of the aspects described in this disclosure.

At 1710, a beam redirection is initiated from a first satellite to a second satellite for a plurality of UEs in a non-terrestrial network (NTN).

At 1720, a group configuration message of downlink control information is generated that initiates the plurality of UEs to concurrently transfer communication to an alternate beam of the second satellite from a beam of the first satellite based on the beam redirection.

At 1730, the group configuration message of downlink control information is provided to the plurality of UEs.

Figure 18:
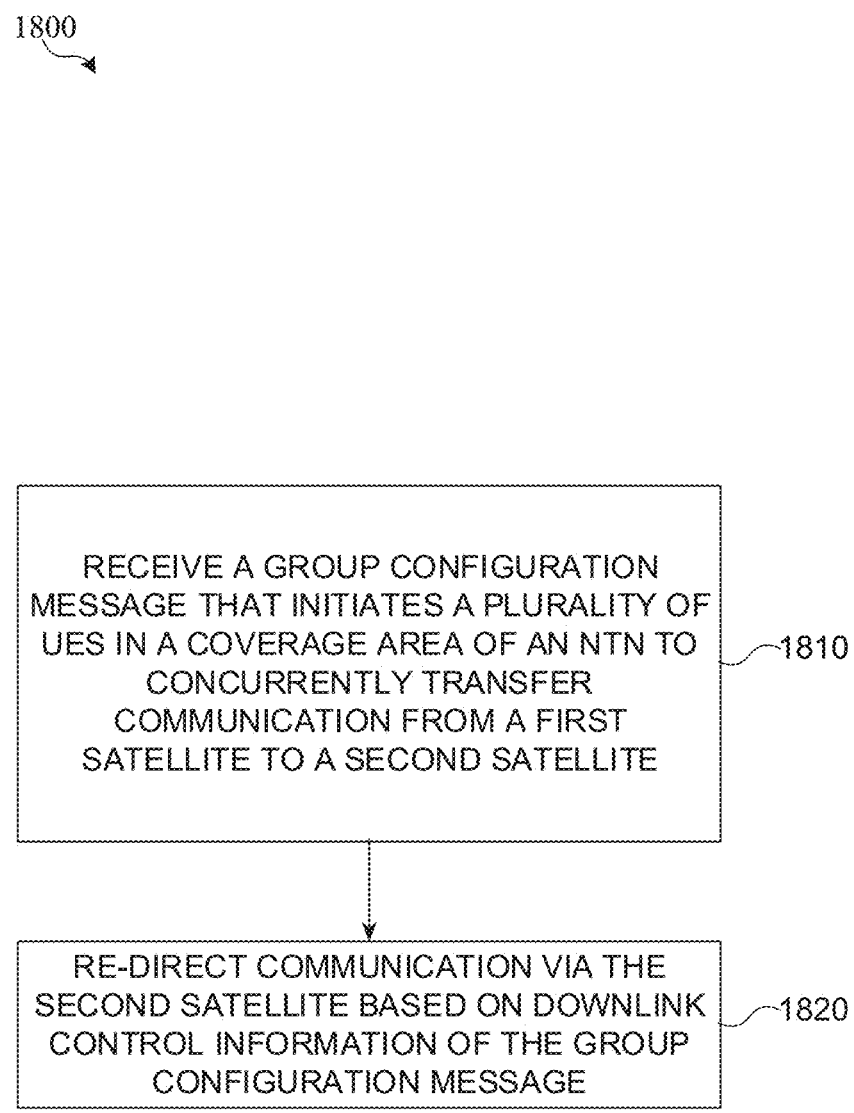
FIG. 18 is another block diagram illustrating an example process flow for NTN handover procedures according to aspects discussed herein.

Referring to FIG. 18, illustrated is an example of a process flow for group handover of earth fixed and mobile beams in accordance with each of the aspects described in this disclosure.

At 1810, the process flow comprises receiving a group configuration message that initiates a plurality of UEs in a coverage area of a non-terrestrial network (NTN) to concurrently transfer communication from a first satellite to a second satellite.

At 1820, the process flow includes re-directing communication via the second satellite based on downlink control information of the group configuration message.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is a base station, comprising: a memory; and a processor configured to: initiate a beam redirection from a first satellite to a second satellite for a plurality of UEs in a non-terrestrial network (NTN); generate a group configuration message of downlink control information that initiates the plurality of UEs to concurrently transfer communication to an alternate beam of the second satellite from a beam of the first satellite based on the beam redirection; and provide the group configuration message of downlink control information to the plurality of UEs.

A second example can include the first example, wherein the processor is further configured to: generate the group configuration message of downlink control information in response to beam strength measurements from the plurality of UEs satisfying a particular threshold of the beam stream measurements.

A third example can include the first or second example, wherein the processor is further configured to: generate the group configuration message of downlink control information in response to a change of an angle of incidence (AOI) satisfying a particular AOI threshold for one or more earth fixed beams of the first satellite to initiate a handover of the plurality of UEs to the second satellite.

A fourth example can include any one or more of the first through third examples, wherein the processor is further configured to: generate the group configuration message of downlink control information in response to an identification of at least a partial overlap of a coverage area of the first satellite and the second satellite for earth moving beams of the first satellite and the second satellite.

A fifth example can include any one or more of the first through fourth examples, wherein the processor is further configured to: generate the group configuration message of downlink control information based on ephemeris data related to at least one of: the first satellite, the second satellite, or the plurality of UEs.

A sixth example can include any one or more of the first through fifth examples, further comprising a next generation NodeB (gNB) comprising: at least one of: the first satellite or the second satellite; and a distributed unit, connected to a processor component of the at least one of: the first satellite or the second satellite, comprising a user plane configured to transfer data between a user equipment (UE) and the processing component of the at least one of: first satellite or the second satellite.

A seventh example can include any one or more of the first through sixth examples, wherein the processor is further configured to: provide the group configuration message of downlink control information that comprises a configuration of a target gNB of the second satellite to the plurality of UEs.

An eighth example can include any one or more of the first through seventh examples, wherein the processor is further configured to: provide the configuration of the target gNB of the second satellite to a distributed unit of the target gNB at the second satellite, wherein the plurality of UEs are within a coverage area of the at least one of: the first satellite or the second satellite, wherein the second satellite comprises an incoming satellite to a coverage area of the first satellite.

A ninth example can include any one or more of the first through eighth examples, wherein the processor is further configured to: generate a determination, without UE feedback, of whether to configure a handover of the plurality of UEs to a target gNB based on ephemeris data related to at least one of: the first satellite, the second satellite, or the plurality of UEs; and generate the group configuration message of downlink control information to concurrently indicate a handover command of the plurality of UEs to the target gNB of the second satellite based on the determination.

A tenth example can include any one or more of the first through ninth examples, wherein the processor is further configured to: provide one or more cell identities (IDs) of the plurality of UEs to a target gNB or a core network component.

An eleventh example can include any one or more of the first through tenth examples, wherein the processor is further configured to: initiate the beam redirection and generate the group configuration message of downlink control information without providing a radio resource control reconfiguration message to the plurality of UEs or without considering a measurement report message of the plurality of UEs.

A twelfth example can include any one or more of the first through eleventh examples, wherein the processor is further configured to: provide a group registration configuration message for the plurality of UEs to update registration with a next generation (NG) core network component for a path switch request/acknowledge response message flow, based on ephemeris data related to the plurality of UEs.

A thirteenth example is a user equipment (UE), comprising: a memory; and a processor configured to: receive a group configuration message that initiates a plurality of UEs in a coverage area of a non-terrestrial network (NTN) to concurrently transfer communication from a first satellite to a second satellite; and re-direct communication via the second satellite based on downlink control information of the group configuration message.

A fourteenth example can include the thirteenth example, wherein the processor is further configured to be in a radio resource control (RRC) idle mode or an RRC connected mode upon receiving the group configuration message.

A fifteenth example can include any one or more of the thirteenth through the fourteenth examples, wherein the processor is further configured to: communicate a registration with a target next generation NodeB (gNB) of the second satellite according to a handover command of the group configuration message for a handover to the target gNB, wherein the handover command of the group configuration message initiates a handover from a source gNB to the target gNB for the plurality of UEs.

A sixteenth example can include any one or more of the thirteenth through the fifteenth examples, wherein the group configuration message comprises a broadcast or a multi-cast radio resource control (RRC) reconfiguration message based on a group radio network temporary identifier (G-RNTI).

A seventeenth example can include any one or more of the thirteenth through the sixteenth examples, wherein the group configuration message comprises a broadcast or a multi-cast radio resource control (RRC) reconfiguration message that is an acknowledgment-less (ACK-less) message.

An eighteenth example can include any one or more of the thirteenth through the seventeenth examples, wherein the processor is further configured to: provide an acknowledgment message in response to receiving the group configuration message, based on whether a UE specific configuration is being requested, wherein the acknowledgement message comprises a UE specific configuration request.

A nineteenth example includes any one or more of the thirteenth through eighteenth examples, wherein the processor is further configured to: provide an acknowledgment (ACK) message comprising a radio link control (RLC) ACK or a layer 1 ACK in response to receiving the group configuration message.

A twentieth example includes any one or more of the thirteenth through nineteenth examples, wherein the processor is further configured to: determine a configuration of a target next generation NodeB (gNB) of the second satellite based on a system information block (SIB) of the group configuration message.

A twenty-first example includes any one or more of the thirteenth through twentieth examples, wherein the group configuration message comprises a group page message comprising an ID from a source gNB of the first satellite that triggers a reconfiguration request in response to being in an overlap area of a coverage area associated with the first satellite and the second satellite to initiate a handover to a target gNB of the second satellite.

A twenty-second example includes any one or more of the thirteenth through twenty-first examples, wherein the processor is further configured to: receive an additional group page message from the target gNB to enable the handover of the UE with the plurality of UEs to the target gNB of the second satellite.

A twenty-third example includes any one or more of the thirteenth through twenty-second examples, wherein the processor is further configured to: store one or more common configurations of the group configuration message in the memory; and process the group configuration message based on at least one of: a delay timer, a time, or a location.

A twenty-fourth example is a baseband processor, comprising: a memory; a processor configured to: initiate a beam redirection from a first satellite to a second satellite for a plurality of UEs in a non-terrestrial network (NTN); generate a group configuration message of downlink control information that initiates the plurality of UEs to concurrently transfer communication to an alternate beam of the second satellite from a beam of the first satellite based on the beam redirection; and provide the group configuration message of downlink control information to the plurality of UEs.

A twenty-fifth example includes the twenty-fourth example, wherein the processor is further configured to: generate the group configuration message of downlink control information in response to at least one of: beam stream measurements from the plurality of UEs satisfying a predetermined threshold of the beam stream measurements, a change of an angle of incidence (AOI) satisfying a predetermined AOI threshold for one or more earth fixed beams of the first satellite to initiate a handover of the plurality of UEs to the second satellite, or an identification of at least a partial overlap of a coverage area of the first satellite and the second satellite for earth moving beams of the first satellite and the second satellite.

A twenty-sixth example can include an apparatus comprising a method or means for executing any of the described operations of the first example through the twenty-fifth example.

A twenty seventh-example can include a machine readable medium that stores instructions for execution by a processor to perform any of the described operations of the first example through the twenty-fifth example.

A twenty-eight example can include a baseband processor comprising: a memory interface; and processing circuitry configured to: perform any of the described operations of the first example through the twenty-fifth example.

A twenty-ninth example can include a User Equipment (UE) configured to execute any of the described operations of the first example through the twenty-fifth example.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A base station, comprising:
    a transceiver;
    a memory; and
    a processor coupled to the transceiver and the memory, wherein the processor is configured to, when executing instructions stored on the memory, cause the base station to:
        initiate a beam redirection from a first satellite to a second satellite for a plurality of UEs in a non-terrestrial network (NTN);
        generate a group configuration message of downlink control information that initiates the plurality of UEs to concurrently transfer communication to an alternate beam of the second satellite from a beam of the first satellite based on the initiating of the beam redirection; and
        transmit, via the transceiver, the group configuration message of downlink control information to the plurality of UEs; and
        transmit a group registration configuration message for the plurality of UEs to update a registration with a core network component for a path switch request/acknowledge response message flow, based on ephemeris data related to the plurality of UEs.

2. The base station of claim 1, wherein:
    the group configuration message of downlink control information is generated in response to beam strength measurements from the plurality of UEs satisfying a particular threshold of the beam strength measurements.

3. The base station of claim 1, wherein:
    the group configuration message of downlink control information is generated in response to a change of an angle of incidence (AOI) satisfying a particular AOI threshold for one or more earth fixed beams of the first satellite.

4. The base station claim 1, wherein:
    the group configuration message of downlink control information is generated in response to an identification of at least a partial overlap of coverage areas of the first satellite and the second satellite for earth moving beams of the first satellite and the second satellite.

5. The base station of claim 1, wherein:
    the group configuration message of downlink control information is generated based on ephemeris data related to at least one of: the first satellite, the second satellite, or the plurality of UEs.

6. The base station of claim 1, further comprising:
    a distributed unit, connected to a processor component of the first satellite,
    wherein the group configuration message of downlink control information comprises a configuration of a target base station associated with the second satellite,
    wherein the processor is further configured to cause the base station to provide the configuration of the target base station to a distributed unit of the target base station
    wherein the plurality of UEs are within at least a coverage area of the first satellite or a coverage area of the second satellite, and
    wherein the second satellite comprises an incoming satellite to the coverage area of the first satellite.

7. The base station of claim 1, wherein the processor is further configured to cause the base station to:
    generate a determination, without UE feedback, of whether to configure a handover of the plurality of UEs to a target base station associated with the second satellite based on ephemeris data related to at least one of: the first satellite, the second satellite, or the plurality of UEs;
    wherein the group configuration message of downlink control information is generated to concurrently indicate a handover command of the plurality of UEs to the target base station based on the determination.

8. The base station of claim 1, wherein:
    the beam redirection is initiated and the group configuration message of downlink control information is generated without providing a radio resource control reconfiguration message to the plurality of UEs or without considering a measurement report message of the plurality of UEs.

9. A user equipment (UE), comprising:
a transceiver;
a memory; and
a processor coupled to the transceiver and the memory, wherein the processor is configured to, when executing instructions stored on the memory, cause the UE to:
receive, via the transceiver, a group configuration message that initiates a plurality of UEs in a coverage area of a non-terrestrial network (NTN) to concurrently transfer communication from a first satellite to a second satellite;
transmit, via the transceiver, an acknowledgment message in response to receiving the group configuration message, wherein the acknowledgment message comprises a UE specific configuration request;
receive, via the transceiver, a UE specific configuration response in response to the UE specific configuration request, the UE specific configuration response comprising a UE specific configuration; and
re-direct communication via the second satellite based on at least one of downlink control information of the group configuration message or the UE specific configuration.

10. The UE of claim 9, wherein the processor is further configured to cause the UE to be in a radio resource control (RRC) idle mode or an RRC connected mode upon receiving the group configuration message.

11. The UE of claim 9, wherein the processor is further configured to cause the UE to:
communicate, via the transceiver, a registration with a target base station associated with the second satellite according to a handover command of the group configuration message for a handover from a source base station to the target base station for the plurality of UEs.

12. The UE of claim 9, wherein the group configuration message comprises a broadcast or a multi-cast radio resource control (RRC) reconfiguration message based on a group radio network temporary identifier (G-RNTI).

13. The UE of claim 9, wherein the group configuration message comprises a broadcast or a multi-cast radio resource control (RRC) reconfiguration message that is an acknowledgment-less (ACK-less) message.

14. The UE of claim 9, wherein the processor is further configured to cause the UE to:
transmit, via the transceiver, an acknowledgment (ACK) message comprising a radio link control (RLC) ACK or a layer 1 ACK in response to receiving the group configuration message.

15. The UE of claim 9, wherein the processor is further configured to cause the UE to:
determine a configuration of a target base station associated with the second satellite based on a system information block (SIB) of the group configuration message;
store one or more common configurations of the group configuration message in the memory; and
process, in response to storing the one or more common configurations, the group configuration message based on at least one of: a delay timer, a time, or a location stored in the one or more common configurations.

16. The UE of claim 9, wherein the group configuration message comprises a group page message comprising an ID from a source base station associated with the first satellite that triggers a reconfiguration request in response to being in an overlap area of coverage areas associated with the first satellite and the second satellite to initiate a handover to a target base station associated with the second satellite, and wherein the processor is further configured to receive, via the transceiver, an additional group page message from the target base station to enable the handover of the UE with the plurality of UEs to the target base station.

17. A user equipment (UE), comprising:
a memory; and
a processor configured to:
receive a group configuration message that initiates a plurality of UEs in a coverage area of a non-terrestrial network (NTN) to concurrently transfer communication from a first satellite to a second satellite;
determine a configuration of a target next generation NodeB (gNB) of the second satellite based on a system information block (SIB) of the group configuration message;
store one or more common configurations of the group configuration message in the memory;
process the group configuration message based on at least one of: a delay timer, a time, or a location; and
re-direct communication via the second satellite based on downlink control information of the group configuration message.

* * * * *